(12) United States Patent
Constantz et al.

(10) Patent No.: US 7,749,476 B2
(45) Date of Patent: Jul. 6, 2010

(54) PRODUCTION OF CARBONATE-CONTAINING COMPOSITIONS FROM MATERIAL COMPRISING METAL SILICATES

(75) Inventors: Brent R. Constantz, Portola Valley, CA (US); Laurence Clodic, Sunnyvale, CA (US); Cecily Ryan, San Jose, CA (US); Miguel Fernandez, San Jose, CA (US); Kasra Farsad, San Jose, CA (US); Sidney Omelon, Los Gatos, CA (US); Philip Tuet, Milpitas, CA (US); Paulo Monteiro, El Cerrito, CA (US); Gordon E. Brown, Jr., Palo Alto, CA (US); Katharine Geramita, Los Gatos, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 12/501,217

(22) Filed: Jul. 10, 2009

(65) Prior Publication Data

US 2009/0301352 A1 Dec. 10, 2009

Related U.S. Application Data

(63) Continuation-in-part of application No. 12/344,019, filed on Dec. 24, 2008, which is a continuation-in-part of application No. PCT/US2008/088246, filed on Dec. 23, 2008, and a continuation-in-part of application No. PCT/US2008/088242, filed on Dec. 23, 2008, application No. 12/501,217, which is a continuation-in-part of application No. 12/486,692, filed on Jun. 17, 2009, which is a continuation-in-part of application No. 12/344,019, filed on Dec. 24, 2008.

(60) Provisional application No. 61/079,790, filed on Jul. 10, 2008, provisional application No. 61/017,405, (Continued)

(51) Int. Cl.
  C01F 11/00 (2006.01)
  C01F 5/00 (2006.01)
  C01B 33/12 (2006.01)
  B01J 19/00 (2006.01)
  C25B 1/00 (2006.01)

(52) U.S. Cl. .................. 423/430; 423/165; 423/335; 422/187; 422/189; 205/477

(58) Field of Classification Search ...................... None
  See application file for complete search history.

(56) References Cited

U.S. PATENT DOCUMENTS 1,678,345 A 7/1928 Mattison (Continued)

FOREIGN PATENT DOCUMENTS

AU 2007100157 4/2007

(Continued)

OTHER PUBLICATIONS

Huijgen, W.J.J., et al. 2005. Mineral CO2 Sequestration by Steel Slag Carbonation. *Environ. Sci. Technol.* 39: 9676-9682.

(Continued)

*Primary Examiner*—Jennifer A Leung

(57) ABSTRACT

Provided are methods for producing carbonate-containing compositions comprising silicon-based material (e.g., pozzolanic material) from a source of carbon dioxide, a divalent cation-containing solution, and a source of proton-removing agents. In such methods, divalent cations of the divalent cation-containing solution are provided by digestion of material comprising metal silicates. Also provided are methods for producing carbonate-containing compositions comprising little or no silicon-based material. In such methods, silicon-based material (e.g., silica, unreacted or undigested silicates, aluminosilicates, etc.) may be separated and processed separately from carbonate-containing compositions. Silicon-based material and carbonate-containing material may be blended at a later stage to produce a pozzolanic material, which may be further processed and blended with, for example, Portland cement.

20 Claims, 11 Drawing Sheets

Related U.S. Application Data filed on Dec. 28, 2007, provisional application No. 61/057,173, filed on May 29, 2008, provisional application No. 61/073,766, filed on Jul. 22, 2008, provisional application No. 61/088,340, filed on Aug. 12, 2008, provisional application No. 61/088,347, filed on Aug. 13, 2008, provisional application No. 61/101,626, filed on Sep. 30, 2008, provisional application No. 61/121,872, filed on Dec. 11, 2008, provisional application No. 61/073,319, filed on Jun. 17, 2008, provisional application No. 61/082,766, filed on Jul. 22, 2008.

(56) References Cited

U.S. PATENT DOCUMENTS

| | | | |
|---|---|---|---|
| 1,865,833 | A | 7/1932 | Chesny |
| 1,897,725 | A | 2/1933 | Gaits et al. |
| 2,329,940 | A | 9/1943 | Ponzer |
| 2,383,674 | A | 8/1945 | Osborne |
| 2,606,839 | A | 8/1952 | Evans |
| 2,934,419 | A | 4/1960 | Cook |
| 2,967,807 | A | 1/1961 | Osborne et al. |
| 3,046,152 | A | 7/1962 | Tsuneyoshi |
| 3,179,579 | A | 4/1965 | Gustave et al. |
| 3,350,292 | A | 10/1967 | Weinberger et al. |
| 3,374,164 | A | 3/1968 | Balej et al. |
| 3,420,775 | A | 1/1969 | Cadwallader |
| 3,463,814 | A | 8/1969 | Blanco et al |
| 3,466,169 | A | 9/1969 | Nowak et al. |
| 3,511,595 | A | 5/1970 | Fuchs |
| 3,511,712 | A | 5/1970 | Giner |
| 3,525,675 | A | 8/1970 | Gaudin |
| 3,558,769 | A | 1/1971 | Globus |
| 3,574,530 | A | 4/1971 | Suriani et al. |
| 3,627,479 | A | 12/1971 | Yee |
| 3,725,267 | A | 4/1973 | Gelblum |
| 3,864,236 | A | 2/1975 | Lindstrom |
| 3,904,496 | A | 9/1975 | Harke et al. |
| 3,917,795 | A | 11/1975 | Pelczarski et al. |
| 3,925,534 | A | 12/1975 | Singleton et al. |
| 3,953,568 | A | 4/1976 | Seko et al. |
| 3,963,592 | A | 6/1976 | Lindstrom |
| 3,970,528 | A | 7/1976 | Zirngiebl et al. |
| 4,026,716 | A | 5/1977 | Urschel, III et al. |
| 4,036,749 | A | 7/1977 | Anderson |
| 4,080,270 | A | 3/1978 | O'Leary et al. |
| 4,107,022 | A | 8/1978 | Strempel et al. |
| 4,128,462 | A | 12/1978 | Ghiringhelli et al. |
| 4,140,510 | A | 2/1979 | Scholze et al. |
| 4,147,599 | A | 4/1979 | O'Leary et al. |
| 4,188,291 | A | 2/1980 | Anderson |
| 4,217,186 | A | 8/1980 | McRae |
| 4,242,185 | A | 12/1980 | McRae |
| 4,264,367 | A | 4/1981 | Schutz |
| 4,335,788 | A | 6/1982 | Murphey et al. |
| 4,361,475 | A | 11/1982 | Moeglich |
| 4,370,307 | A | 1/1983 | Judd |
| 4,376,101 | A | 3/1983 | Sartori et al. |
| 4,410,606 | A | 10/1983 | Loutfy et al. |
| 4,450,009 | A | 5/1984 | Childs et al. |
| 4,477,573 | A | 10/1984 | Taufen |
| 4,561,945 | A | 12/1985 | Coker et al. |
| 4,620,969 | A | 11/1986 | Wilkinson |
| 4,716,027 | A | 12/1987 | Morrison |
| 4,804,449 | A | 2/1989 | Sweeney |
| 4,818,367 | A | 4/1989 | Winkler |
| 4,838,941 | A | 6/1989 | Hill |
| 4,899,544 | A | 2/1990 | Boyd |
| 4,915,914 | A | 4/1990 | Morrison |
| 4,931,264 | A | 6/1990 | Rochelle et al. |
| 5,037,286 | A | 8/1991 | Roberts |
| 5,100,633 | A | 3/1992 | Morrison |
| 5,230,734 | A | 7/1993 | Kumasaka et al. |
| 5,246,551 | A | 9/1993 | Pletcher et al. |
| 5,282,935 | A | 2/1994 | Cawlfield et al. |
| 5,362,688 | A | 11/1994 | Porta et al. |
| 5,364,611 | A | 11/1994 | Iijima et al. |
| 5,366,513 | A | 11/1994 | Goldmann et al. |
| 5,470,671 | A | 11/1995 | Fletcher et al. |
| 5,520,898 | A | 5/1996 | Pinnavaia et al. |
| 5,531,821 | A | 7/1996 | Wu |
| 5,531,865 | A | 7/1996 | Cole |
| 5,584,923 | A | 12/1996 | Wu |
| 5,584,926 | A | 12/1996 | Borgholm et al. |
| 5,595,641 | A | 1/1997 | Traini et al. |
| 5,614,078 | A | 3/1997 | Lubin et al. |
| 5,624,493 | A | 4/1997 | Wagh et al. |
| 5,702,585 | A | 12/1997 | Hillrichs et al. |
| 5,766,339 | A | 6/1998 | Babu et al. |
| 5,776,328 | A | 7/1998 | Traini et al. |
| 5,785,868 | A | 7/1998 | Li et al. |
| 5,846,669 | A | 12/1998 | Smotkin et al. |
| 5,855,759 | A | 1/1999 | Keating et al. |
| 5,925,255 | A | 7/1999 | Mukhopadhyay |
| 6,024,848 | A | 2/2000 | Dufner et al. |
| 6,059,974 | A | 5/2000 | Scheurman, III |
| 6,071,336 | A | 6/2000 | Fairchild et al. |
| 6,080,297 | A | 6/2000 | Ayers |
| 6,090,197 | A | 7/2000 | Vivian et al. |
| 6,129,832 | A | 10/2000 | Fuhr et al. |
| 6,180,012 | B1 | 1/2001 | Rongved |
| 6,190,428 | B1 | 2/2001 | Rolison et al. |
| 6,200,543 | B1 | 3/2001 | Allebach et al. |
| 6,217,728 | B1 | 4/2001 | Lehmann et al. |
| 6,235,186 | B1 | 5/2001 | Tanaka et al. |
| 6,251,356 | B1 | 6/2001 | Mathur |
| 6,280,505 | B1 | 8/2001 | Torkildsen et al. |
| 6,352,576 | B1 | 3/2002 | Spencer et al. |
| 6,375,825 | B1 | 4/2002 | Mauldin et al. |
| 6,387,212 | B1 | 5/2002 | Christian |
| 6,402,831 | B1 | 6/2002 | Sawara et al. |
| 6,444,107 | B2 | 9/2002 | Hartel et al. |
| 6,475,460 | B1 | 11/2002 | Max |
| 6,495,013 | B2 | 12/2002 | Mazur et al. |
| 6,518,217 | B2 | 2/2003 | Xing et al. |
| 6,537,456 | B2 | 3/2003 | Mukhopadhyay |
| 6,602,630 | B1 | 8/2003 | Gopal |
| 6,623,555 | B1 | 9/2003 | Haverinen et al. |
| 6,638,413 | B1 | 10/2003 | Weinberg et al. |
| 6,648,949 | B1 | 11/2003 | Der et al. |
| 6,712,946 | B2 | 3/2004 | Genders et al. |
| 6,755,905 | B2 | 6/2004 | Oates et al. |
| 6,776,972 | B2 | 8/2004 | Vohra et al. |
| 6,786,963 | B2 | 9/2004 | Matherly et al. |
| 6,841,512 | B1 | 1/2005 | Fetcenko et al. |
| 6,890,419 | B2 | 5/2005 | Reichman et al. |
| 6,890,497 | B2 | 5/2005 | Rau et al. |
| 6,908,507 | B2 | 6/2005 | Lalande et al. |
| 6,936,573 | B2 | 8/2005 | Wertz et al. |
| 7,037,434 | B2 | 5/2006 | Myers et al. |
| 7,040,400 | B2 | 5/2006 | de Rouffignac et al. |
| 7,132,090 | B2 | 11/2006 | Dziedzic et al. |
| 7,135,604 | B2 | 11/2006 | Ding et al. |
| 7,198,722 | B2 | 4/2007 | Hussain |
| 7,261,912 | B2 | 8/2007 | Zeigler |
| 7,285,166 | B2 | 10/2007 | Luke et al. |
| 7,347,896 | B2 | 3/2008 | Harrison |
| 7,427,449 | B2 | 9/2008 | Delaney et al. |
| 7,440,871 | B2 | 10/2008 | McConnell et al. |
| 7,452,449 | B2 | 11/2008 | Weinberg et al. |
| 7,595,001 | B2 | 9/2009 | Arakel et al. |
| 2001/0022952 | A1 | 9/2001 | Rau et al. |

| | | | | | |
|---|---|---|---|---|---|
| 2001/0054253 A1 | 12/2001 | Takahashi et al. | 2010/0024686 A1 | 2/2010 | Constantz et al. |
| 2002/0009410 A1 | 1/2002 | Mathur | | | |
| 2002/0127474 A1 | 9/2002 | Fleischer et al. | | FOREIGN PATENT DOCUMENTS | |
| 2003/0017088 A1 | 1/2003 | Downs et al. | | | |
| 2003/0126899 A1 | 7/2003 | Wolken | CA | 1335974 A1 | 6/1995 |
| 2003/0188668 A1 | 10/2003 | Bland | CA | 2646462 | 9/2007 |
| 2004/0040671 A1 | 3/2004 | Duesel, Jr. et al. | DE | 2653649 A1 | 6/1978 |
| 2004/0040715 A1 | 3/2004 | Wellington et al. | DE | 3146326 A1 | 6/1983 |
| 2004/0052865 A1 | 3/2004 | Gower et al. | DE | 3638317 | 1/1986 |
| 2004/0126293 A1 | 7/2004 | Geerlings et al. | DE | 19523324 A1 | 9/1994 |
| 2004/0213705 A1 | 10/2004 | Blencoe et al. | DE | 19631794 A1 | 8/1997 |
| 2004/0219090 A1 | 11/2004 | Dziedzic et al. | EP | 0522382 A1 | 1/1993 |
| 2004/0228788 A1 | 11/2004 | Nagai et al. | EP | 0487102 B1 | 8/1995 |
| 2004/0259231 A1 | 12/2004 | Bhattacharya | EP | 0591350 B1 | 11/1996 |
| 2004/0267077 A1 | 12/2004 | Ding et al. | EP | 0628339 B1 | 9/1999 |
| 2005/0002847 A1 | 1/2005 | Maroto-Valer et al. | EP | 0844905 B1 | 3/2000 |
| 2005/0011770 A1 | 1/2005 | Katsuyoshi et al. | EP | 1379469 B1 | 3/2006 |
| 2005/0031522 A1 | 2/2005 | Delaney et al. | EP | 1650162 A1 | 4/2006 |
| 2005/0036932 A1 | 2/2005 | Takahashi et al. | EP | 1716911 A1 | 11/2006 |
| 2005/0087496 A1 | 4/2005 | Borseth | EP | 1554031 B1 | 12/2006 |
| 2005/0118081 A1 | 6/2005 | Harris et al. | EP | 1571105 B1 | 12/2007 |
| 2005/0129606 A1 | 6/2005 | Mitsuhashi et al. | GB | 911386 A | 11/1962 |
| 2005/0154669 A1 | 7/2005 | Streetman | GB | 2371810 | 8/2002 |
| 2005/0180910 A1 | 8/2005 | Park et al. | JP | 51102357 A1 | 9/1976 |
| 2005/0238563 A1 | 10/2005 | Eighmy et al. | JP | 59100280 | 12/1982 |
| 2005/0255174 A1 | 11/2005 | Shelley et al. | JP | 1142093 | 11/1987 |
| 2006/0048517 A1 | 3/2006 | Fradette et al. | JP | 63-312988 | 12/1988 |
| 2006/0051274 A1 | 3/2006 | Wright et al. | JP | 03-020491 | 1/1991 |
| 2006/0060532 A1 | 3/2006 | Davis | JP | 2003041388 | 7/2001 |
| 2006/0105082 A1 | 5/2006 | Zeigler | WO | WO 93/16216 A1 | 8/1993 |
| 2006/0165583 A1 | 7/2006 | Makino et al. | WO | WO 96/34997 A1 | 11/1996 |
| 2006/0169593 A1 | 8/2006 | Xu et al. | WO | WO 99/13967 A1 | 3/1999 |
| 2006/0184445 A1 | 8/2006 | Sandor et al. | WO | WO 01/07365 A1 | 2/2001 |
| 2006/0185516 A1 | 8/2006 | Moriyama et al. | WO | WO 01/96243 A1 | 12/2001 |
| 2006/0185560 A1 | 8/2006 | Ramme et al. | WO | WO 02/00551 A2 | 1/2002 |
| 2006/0185985 A1 | 8/2006 | Jones | WO | WO 03/008071 A1 | 1/2003 |
| 2006/0195002 A1 | 8/2006 | Grandjean et al. | WO | WO 03/054508 A2 | 7/2003 |
| 2006/0196836 A1 | 9/2006 | Arakel et al. | WO | WO 03/068685 A1 | 8/2003 |
| 2006/0288912 A1 | 12/2006 | Sun et al. | WO | WO 2004/041731 A1 | 5/2004 |
| 2007/0056487 A1 | 3/2007 | Anthony et al. | WO | WO 2004/094043 A2 | 11/2004 |
| 2007/0092427 A1 | 4/2007 | Anthony et al. | WO | WO 2004/098740 A2 | 11/2004 |
| 2007/0148509 A1 | 6/2007 | Colbow et al. | WO | WO 2005/078836 A2 | 8/2005 |
| 2007/0163443 A1 | 7/2007 | Moriyama et al. | WO | WO 2005/086843 A2 | 9/2005 |
| 2007/0186820 A1 | 8/2007 | O'Hearn | WO | WO 2005/108297 A2 | 11/2005 |
| 2007/0187247 A1 | 8/2007 | Lackner et al. | WO | WO 2006/009600 A2 | 1/2006 |
| 2007/0202032 A1 | 8/2007 | Geerlings et al. | WO | WO 2006/034339 A1 | 3/2006 |
| 2007/0212584 A1 | 9/2007 | Chuang | WO | WO 2006/036396 A2 | 4/2006 |
| 2007/0217981 A1 | 9/2007 | Van Essendelft | WO | WO 2006/134080 A1 | 12/2006 |
| 2007/0240570 A1 | 10/2007 | Jadhav et al. | WO | WO 2007/003013 A1 | 1/2007 |
| 2007/0261947 A1 | 11/2007 | Geerlings et al. | WO | WO 2007/016271 A2 | 2/2007 |
| 2008/0031801 A1 | 2/2008 | Lackner et al. | WO | WO 2007/060149 A1 | 5/2007 |
| 2008/0112868 A1 | 5/2008 | Blencoe et al. | WO | WO 2007/071633 A1 | 6/2007 |
| 2008/0138265 A1 | 6/2008 | Lackner et al. | WO | WO 2007/094691 A1 | 8/2007 |
| 2008/0171158 A1 | 7/2008 | Maddan | WO | WO 2007/096671 A1 | 8/2007 |
| 2008/0223727 A1 | 9/2008 | Oloman et al. | WO | WO 2007/106372 A2 | 9/2007 |
| 2008/0236143 A1 | 10/2008 | Lo | WO | WO 2007/106883 A2 | 9/2007 |
| 2008/0245274 A1 | 10/2008 | Ramme | WO | WO 2007/123917 A2 | 11/2007 |
| 2008/0245660 A1 | 10/2008 | Little et al. | WO | WO 2007/139392 A1 | 12/2007 |
| 2008/0245672 A1 | 10/2008 | Little et al. | WO | WO 2007/140544 A1 | 12/2007 |
| 2008/0248350 A1 | 10/2008 | Little et al. | WO | WO 2008/018928 A2 | 2/2008 |
| 2008/0277319 A1 | 11/2008 | Wyrsta | WO | WO 2008/026201 A2 | 3/2008 |
| 2008/0289495 A1 | 11/2008 | Eisenberger et al. | WO | WO 2008/031834 A1 | 3/2008 |
| 2009/0001020 A1 | 1/2009 | Constantz et al. | WO | WO 2008/061305 A1 | 5/2008 |
| 2009/0010827 A1 | 1/2009 | Geerlings et al. | WO | WO 2008/068322 A1 | 6/2008 |
| 2009/0081093 A1 | 3/2009 | Comrie | WO | WO 2008/089523 A1 | 7/2008 |
| 2009/0081096 A1 | 3/2009 | Pellegrin | WO | WO 2008/095057 A2 | 8/2008 |
| 2009/0090277 A1 | 4/2009 | Joshi et al. | WO | WO 2008/101293 A1 | 8/2008 |
| 2009/0169452 A1 | 7/2009 | Constantz et al. | WO | WO 2008/108657 A1 | 9/2008 |
| 2009/0186244 A1 | 7/2009 | Mayer | WO | WO 2008/115662 A2 | 9/2008 |
| 2009/0232861 A1 | 9/2009 | Wright et al. | WO | WO 2008/124538 A1 | 10/2008 |
| 2009/0301352 A1 | 12/2009 | Constantz et al. | WO | WO 2008/140821 A2 | 11/2008 |
| | | | WO | WO 2008/142017 A2 | 11/2008 |
| | | | WO | WO 2008/142025 A2 | 11/2008 |

| | | |
|---|---|---|
| WO | WO 2008/151060 A1 | 12/2008 |
| WO | WO 2009/006295 A2 | 1/2009 |
| WO | WO 2009/024826 A1 | 2/2009 |
| WO | WO 2009/039655 A1 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |

OTHER PUBLICATIONS

Huijgen, W.J.J., et al. 2006. Energy Consumption and Net CO2 Sequestration of Aqueous Mineral Carbonation. *Ind. Eng. Chem. Res.* 45: 9184-9194.

Huntzinger, D.N. et al. 2009. A life-cycle assessment of Portland cement manufacturing: comparing the traditional process with alternative technologies. *Journal of Cleaner Production.* 17: 668-675.

International Search Report dated Jan. 4, 2010 of PCT/US09/062795.

International Search Report dated Jan. 13, 2010 of PCT/US09/059135.

Sethi, S. et al. 2006. Existing & Emerging Concentrate Minimization & Disposal Practices for Membrane Systems. *Florida Water Resources Journal.* pp. 38, 40, 42, 44, 46, 48.

U.S. Appl. No. 12/163,205, filed Jun. 27, 2008, Constantz, Brent R., et al, Non-Final Office Action dated Jan. 27, 2010.

U.S. Appl. No. 12/344,019, filed Dec. 24, 2008, Constantz, Brent R., et al, Non-Final Office Action dated Nov. 16, 2009.

International Search Report dated Sep. 17, 2008 of PCT/US2008/068564.

"Electrochemical cell", WIKIPEDIA (2009), http:en.wikipedia.org/wiki/Electrochemical_Cell, Nov. 24, 2009, 5 pp.

International Search Report dated Dec. 14, 2009 of PCT/US09/061748.

Wen-Zhi et al., "Using Electrolytic Method to Promote CO2 Sequestration in Serpentine by Mineral Carbonation"; Journal of China University of Mining and Technology; vol. 36, No. 6; Nov. (2007) (Publication and English Translation).

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Back, M. et al.,"Reactivity of Alkaline Lignite Fly Ashes Towards CO in Water." Environmental Science & Technology. vol. 42, No. 12 (2008) pp. 4520-4526.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. American Geophysical Union Abstract #U22A-07.

CICCS "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. Electrochimica Acta 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Gain, E. et al. 2002. Ammonium nitrate wastewater treatment by coupled membrane electrolysis and electrodialysis. Journal of Applied Electrochemistry 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp (Date Unknown).

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp (Date Unknown).

Holze,S. et al. 1994. Hydrogen Consuming Anodes for Energy Saving in Sodium Sulphate Electrolysis. Chem. Eng. Technol. 17: 382-389.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Feb. 19, 2009 of PCT/US08/88242.

Justnes, H. et al. "Pozzolanic, Amorphous Silica Produced from the Mineral Olivine." Proceedings of the Seventh CANMET/ACI International Conference on Fly Ash, Silica Fume, Slag And Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11):1153-1170.

Mazrou, S., et al. 1997. Sodium hydroxide and hydrochloric acid generation from sodium chloride and rock salt by electro-electrodialysis. Journal of Applied Electrochemistry 27: 558-567.

Montes-Hernandez, G. et al.,"Mineral sequestration of CO2 by aqueous carbonation of coal combustion fly-ash." Journal of Hazardous Materials vol. 161 (2009). pp. 1347-1354.

Nayak, V.S. "Nonelectrolytic Production of Caustic Soda and Hydrochloric Acid from Sodium Chloride"; Ind. Eng. Chem. Res. 1996. 35: 3808-3811.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

O'Connor et al., "Carbon Dioxide Sequestration by Direct Mineral Carbonation: Results From Recent Studies And Current Status"; Albany Research Center, Albany Oregon; Office of Fossil Energy, US Dept. of Energy; 1st Annual DOE Carbon Sequestration Conference, Washington DC, May 2001 12pp.

Park, A., et al. 2004. CO2 mineral sequestration: physically activated dissolution of serpentine and pH swing process. Chemical Engineering Science 59 (22-23): 5241-5247.

Rau, G. 2004. Possible use of Fe/CO2 fuel cells for CO2 mitigation plus H2 and electricity production. Energy Conversion and Management. 45:2143-2152.

Raz et al., "Formation of High-Magnesium Calcites via an Amorphous Precursor Phase: Possible Biological Implications", Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp, Oct. 26, 2007.

Serizawa et al., "Cell-compatible properties of calcium carbonates and hydroxyapatite depostied on a ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp (Date Unknown).

Tececo PTY LTD, "Eco-Cement"; www.tececo.com/simple.eco-cement.php; Dec. 29, 2008; 6pp.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Sadhwani et al., "Case Studies on environmental impact of seawater desalination" Science Direct; http://www.sciencedirect.com/science?_ob=ArticleURL&_udi=B6TFX-4HMX97J-3&_u . . . 3pp (Available online Nov. 24, 2005).

U.S. Appl. No. 12/375,632, filed Mar. 5, 2009, Kirk, Donald W. et al, Non-Final Office Action dated Sep. 8, 2009.

"Biomass Burning: A Hot Issue in Global Change." National Aeronautics and Space Administration. Langley Research Center, Hampton, Virginia Fact Sheet FS-2001-02-56-LaRC. Feb. 2001. 4 pages.

Cannell, M.G.R. 2003. "Carbon sequestration and biomass energy offset: theoretical, potential and achievable capacities globally, in Europe and the UK." Biomass and Bioenergy. 24: 97-116.

Levy, D. "Burnt biomass causes short-term global cooling, long-term warming." http://news-service.stanford.edu/news/2004/august4/biomass-84.html. 3 pages. (Aug. 4, 2004).

Turner, J.A. 1999. "A Realizable Renewable Energy Future." Science. 285 (5428): 687-689.

Wright, L.L., et al. 1993. "U.S. Carbon Offset Potential Using Biomass Energy Systems." Water, Air, and Soil Pollution. 70: 483-497.

PRODUCTION OF CARBONATE-CONTAINING COMPOSITIONS FROM MATERIAL COMPRISING METAL SILICATES

CROSS-REFERENCE

This application claims the benefit of U.S. Provisional Patent Application No. 61/079,790, filed on Jul. 10, 2008. This application is a continuation-in-part application of U.S. patent application Ser. No. 12/344,019, filed on Dec. 24, 2008, which claims the benefit of U.S. Provisional Patent Application No. 61/017,405, filed Dec. 28, 2007, U.S. Provisional Patent Application No. 61/057,173, filed May 29, 2008, U.S. Provisional Patent Application No. 61/073,319, filed Jun. 17, 2008, U.S. Provisional Patent Application No. 61/082,766, filed Jul. 22, 2008, U.S. Provisional Patent Application No. 61/088,340, filed Aug. 12, 2008, U.S. Provisional Patent Application No. 61/088,347, filed Aug. 13, 2008, U.S. Provisional Patent Application No. 61/101,626, filed Sep. 30, 2008, and U.S. Provisional Patent Application No. 61/121,872, filed Dec. 11, 2008; which is a continuation-in-part of International Patent Application No. PCT/US08/088246, filed Dec. 23, 2008; and which is a continuation-in-part of International Patent Application No. PCT/US08/088242, filed Dec. 23, 2008, each of which is incorporated herein by reference in its entirety, and to each of which we claim priority under 35 U.S.C. §120. This application is also a continuation-in-part of U.S. patent application Ser. No. 12/486,692, filed on Jun. 17, 2009, which claims the benefit of U.S. Provisional Patent Application No. 61/073,319, filed Jun. 17, 2008 and U.S. Provisional Patent Application No. 61/079,790, filed Jul. 10, 2008, and which is a continuation-in-part of U.S. patent application Ser. No. 12/344,019, filed Dec. 24, 2008, each of which is incorporated herein by reference, and to each of which we claim priority under 35 U.S.C. §120.

BACKGROUND

Concrete is the most widely used engineering material in the world. It is estimated that the present world consumption of concrete is 11 billion metric tons per year. (Concrete, Microstructure, Properties and Materials (2006, McGraw-Hill)). Concrete is a term that refers to a composite material of a binding medium having particles or fragments of aggregate embedded therein. In most construction concretes currently employed, the binding medium is formed from a mixture of a hydraulic cement and water.

Hydraulic cements are compositions that set and harden after combining with water. After hardening, hydraulic cements retain strength and stability even under water. The key requirement for this characteristic is that the hydrates that are formed from the hydration of the constituents of the cement are essentially insoluble in water. Cements may be employed by themselves or in combination with aggregates, both coarse and fine, in which case the compositions may be referred to as concretes or mortars, respectively. Most hydraulic cements employed today are based upon Portland cement. Portland cement is made primarily from limestone, certain clay minerals, and gypsum in a high temperature process that drives off carbon dioxide ($CO_2$) and chemically combines the primary ingredients into new compounds.

Carbon dioxide emissions from Portland cement production and other industrial processes such as fossil fuel-based power generation (e.g., coal-fired power plant) contribute to the phenomenon of global warming. It is expected that elevated atmospheric concentration of carbon dioxide and other greenhouse gases will facilitate greater storage of heat within the atmosphere leading to enhanced surface temperatures and rapid climate change. In addition, elevated levels of carbon dioxide in the atmosphere are expected to further acidify the world's oceans due to the dissolution of carbon dioxide and formation of carbonic acid. The impact of climate change and ocean acidification will likely be economically expensive and environmentally hazardous if not timely handled. Sequestration and avoidance of carbon dioxide from various anthropogenic processes offer the potential to reduce risk of climate change.

The invention disclosed herein provides for sequestration and avoidance of carbon dioxide through methods and systems for producing carbonate-containing compositions from material comprising metal silicates, which compositions may be used in concrete.

SUMMARY

Provided is a method comprising digesting a material comprising a metal silicate with an aqueous solution to produce divalent cations and a material comprising $SiO_2$; reacting the divalent cations with dissolved carbon dioxide to produce a precipitation material; and drying the precipitation material. In such methods, the precipitation material may dried to form a fine powder having a consistent particle size distribution. The method may further comprise comminuting the material comprising the metal silicate prior to digesting the material comprising the metal silicate, wherein the material comprising the metal silicate comprises a rock or mineral, and further wherein the mineral includes orthosilicates, inosilicates, phyllosilicates, and tectosilicates. Orthosilicate minerals comprise olivine group minerals, and phyllosilicate minerals comprise serpentine group minerals. In some embodiments, digesting the material comprising the metal silicate comprises digestion with an acid to produce an acidic solution comprising the divalent cations and the material comprising $SiO_2$. The acid may be selected from the group consisting of HF, HCl, HBr, HI, $H_2SO_4$, $HNO_3$, $H_3PO_4$, chromic acid, $H_2CO_3$, acetic acid, citric acid, formic acid, gluconic acid, lactic acid, oxalic acid, tartaric acid, ascorbic acid, and meldrums acid. In some embodiments, the acid is HCl. After digestion, the acidic solution may be contacted with a proton-removing agent. In some embodiments, the acidic solution is made a basic solution by contact with the proton-removing agent, which proton-removing agent may be a hydroxide selected from the group consisting of NaOH, KOH, $Ca(OH)_2$, and $Mg(OH)_2$. In some embodiments, the hydroxide is NaOH. In some embodiments, digesting the material comprising the metal silicate comprises digestion with a proton-removing agent to produce a basic solution comprising the divalent cations and the material comprising $SiO_2$. In some embodiments, digestion provides divalent cations comprising alkaline earth metal cations. In some embodiments, the alkaline earth metal cations comprise $Ca^{2+}$, $Mg^{2+}$, or a combination thereof. The method may further comprise isolating the precipitation material. In some embodiments, the precipitation material is isolated from the basic solution with a liquid-solid separation apparatus, which apparatus operates in a continuous, semi-batch, or batch process. In some embodiments, isolation of the precipitation material is a continuous process. The precipitation material may also be dried with a spray dryer in some embodiments to yield a fine powder. In some embodiments, at least 70% of the fine powder falls within ±50 microns of a given mean diameter, wherein the given mean particle diameter is between 5 and 500 microns.

In some embodiments, at least 70% of the fine powder falls within ±50 microns of a given mean diameter, wherein the given mean particle diameter is between 50 and 250 microns. In some embodiments, at least 70% of the fine powder falls within ±50 microns of a given mean diameter, wherein the given mean particle diameter is between 100 and 200 microns. The precipitation material may comprise a pozzolanic material in some embodiments; however, in some embodiments, the method further comprises producing a pozzolanic material from the precipitation material. And, in some embodiments, the method further comprises blending the pozzolanic material with cement.

Also provided is a method comprising digesting a material comprising a metal silicate with an aqueous solution to provide divalent cations and a material comprising $SiO_2$; separating the material comprising $SiO_2$ from the aqueous solution; and reacting the divalent cations with dissolved carbon dioxide to produce precipitation material. The method may further comprise comminuting the material comprising the metal silicate prior to digesting the material comprising the metal silicate, wherein the material comprising the metal silicate comprises a rock or mineral, and further wherein the mineral includes orthosilicates, inosilicates, phyllosilicates, and tectosilicates. Orthosilicate minerals comprise an olivine group minerals, and phyllosilicate minerals comprise a serpentine group mineral. In some embodiments, digesting the material comprising metal silicates comprises digestion with an acid to produce an acidic solution comprising the divalent cations and the material comprising SiO2. The acid may be selected from the group consisting of HF, HCl, HBr, HI, $H_2SO_4$, $HNO_3$, $H_3PO_4$, chromic acid, $H_2CO_3$, acetic acid, citric acid, formic acid, gluconic acid, lactic acid, oxalic acid, tartaric acid, ascorbic acid, and meldrums acid. In some embodiments, the acid is HCl. After digestion, the acidic solution is contacted with a proton-removing agent. In some embodiments, the acidic solution is made a basic solution by contact with the proton-removing agent, which proton-removing agent may be a hydroxide selected from the group consisting of NaOH, KOH, $Ca(OH)_2$, and $Mg(OH)_2$. In some embodiments, the hydroxide is NaOH. In some embodiments, digesting the material comprising the metal silicate comprises digestion with a proton-removing agent to produce a basic solution comprising the divalent cations and the material comprising $SiO_2$. In some embodiments, digestion provides divalent cations comprising alkaline earth metal cations. In some embodiments, the alkaline earth metal cations comprise $Ca^{2+}$, $Mg^{2+}$, or a combination thereof. Separating the material comprising $SiO_2$ from the aqueous solution may comprise separation with a first liquid-solid separation apparatus, wherein separation with the first liquid-solid separation apparatus is a continuous, semi-batch, or batch process. The method may further comprise isolating the precipitation material after reacting the divalent cations with dissolved carbon dioxide. In such methods, precipitation material may be isolated from the basic solution with a second liquid-solid separation apparatus, wherein isolation of the precipitation material with the second liquid-solid separation apparatus is a continuous, semi-batch, or batch process. In some embodiments, isolation of the precipitation material is a continuous process. Separated material comprising $SiO_2$ and isolated precipitation material may be combined without drying to produce a pozzolanic material. One of separated material comprising $SiO_2$ or isolated precipitation material may also be dried prior to combining to form a pozzolanic material. Furthermore, each of separated material comprising $SiO_2$ and isolated precipitation material may be dried prior to combining to form a pozzolanic material. As such, the precipitation material, the material comprising $SiO_2$, or both the precipitation material and the material comprising $SiO_2$ may be dried with a spray dryer to produce a spray-dried material. In some embodiments, at least 70% of the spray-dried material falls within ±50 microns of a given mean particle diameter, wherein the given mean particle diameter is between 5 and 500 microns. In some embodiments, at least 70% of the spray-dried material falls within ±50 microns of a given mean particle diameter, wherein the given mean particle diameter is between 50 and 250 microns. In some embodiments, at least 70% of the spray-dried material falls within ±50 microns of a given mean particle diameter, wherein the given mean particle diameter is between 100 and 200 microns. The method may further comprise fortifying the pozzolanic material with volcanic ash, fly ash, silica fume, high reactivity metakaolin, or ground granulated blast furnace slag. Methods may further comprise blending the pozzolanic material with cement.

Also provided is a composition produced by any of the foregoing methods. Also provided is a composition comprising a synthetic carbonate, a silicon-based material, and a synthetic iron-based material. The synthetic carbonate may comprise a magnesium carbonate selected from the group consisting of artinite, magnesite, hydromagnesite, nesquehonite, and lansfordite. In some embodiments, the synthetic carbonate comprises nesquehonite. The composition may comprise up to 35% silicon-based material, wherein the silicon-based material comprises silica such as amorphous silica. The iron-based material may comprise iron chloride or iron carbonate. The synthetic carbonate may further comprise a calcium carbonate selected from the group consisting of calcite, aragonite, and vaterite. In some embodiments, the composition further comprises cement, wherein no more than 80% of the composition comprises cement, and wherein no more than 55% of the composition comprises silicon-based material. Some of the compositions comprise a construction material, while some are suitable for use in a construction material. Such construction materials include, but are not limited to cement, aggregate, cementitious material, or supplementary cementitious material.

Also provided is a system comprising a processor for processing a material comprising a metal silicate; a precipitation reactor for precipitating a precipitation material; and a liquid-solid separator for separating the precipitation material from a precipitation reaction mixture, wherein the precipitation reactor is operably connected to both the processor and the liquid-solid separator. In such systems, the processor comprises a size-reduction unit for comminuting the material comprising the metal silicate, wherein the size-reduction unit comprises a ball mill or a jet mill. The processor may further comprise a digester for digesting the material comprising the metal silicate, wherein the digester is configured to receive the material comprising the metal silicate, wherein the material has a reduced size. The digester may be further configured to receive acid from a source of acid, proton-removing agent from a source of proton-removing agent, or a combination thereof. The precipitation reactor of such systems may be configured to receive digested material comprising metal silicates. In addition, the precipitation reactor may be further configured to receive carbon dioxide from an industrial source of carbon dioxide. The liquid-solid separator of such systems may be configured to receive precipitation reaction mixture from the precipitation reactor. The liquid-solid separator may be further configured to separate the precipitation material from the precipitation reaction mixture. The system may further comprise a dryer for producing dried precipitation material, which dryer may be a spray dryer configured to receive a slurry comprising precipitation material from the liquid-solid separator. In some embodiments, the spray dryer is configured to produce dried precipitation material, wherein at least 70% of the dried precipitation material falls within ±50 microns of a given mean particle diameter, wherein the given mean particle diameter is between 5 and 500 microns. In some embodiments, the spray dryer is configured to produce dried precipitation material, wherein at least 70% of the dried precipitation material falls within ±50 microns of a given mean particle diameter, wherein the given mean particle diameter is between 50 and 250 microns. In some embodiments, the spray dryer is configured to produce dried precipitation material, wherein at least 70% of the dried precipitation material falls within ±50 microns of a given mean particle diameter, wherein the given mean particle diameter is between 100 and 200 microns. The spray dryer may also be further configured to utilize waste heat from an industrial source of carbon dioxide, wherein the industrial source of carbon dioxide comprises flue gas from a coal-fired power plant. The spray dryer may be further configured to provide a heat-depleted industrial source of carbon dioxide to the precipitation reactor.

Furthermore, systems and methods for producing a pozzolanic materials are provided. Aspects of the invention include precipitating a carbonate-containing precipitation material comprising $SiO_2$ from a divalent cation-containing solution and producing a pozzolanic material from the resultant precipitation material. A mafic mineral (e.g., olivine) may be contacted with a divalent cation-containing solution (e.g., seawater), producing a carbonate-containing precipitation material by adding a proton-removing agent to the divalent cation-containing solution, and producing a pozzolanic material from the resultant carbonate-containing precipitation material comprising $SiO_2$. The $SiO_2$ may be at least partially amorphous and may also comprise a gel in various embodiments. In some embodiments, the divalent cation-containing solution may be acidified before or while the mafic mineral is contacted with the divalent cation-containing solution, for instance, by bubbling a gas stream including $CO_2$ through the divalent cation-containing solution. The gas stream may comprise an exhaust gas such as flue gas. In some embodiments, the exhaust gas is used by a spray dryer before being used to acidify the divalent cation-containing solution. The same spray drier may be used to dry the carbonate-containing precipitation material. In some embodiments, the method further comprises adding a carbonate promoter, such as a transition metal like iron, to the divalent cation-containing solution to produce the carbonate-containing precipitation material. The carbonate-containing precipitation material may comprise calcium carbonate, magnesium carbonate, calcium magnesium carbonate, or mixtures thereof. Producing the pozzolanic material may include drying a mixture of precipitation material comprising carbonates and SiO2.

Also provided are systems for producing a pozzolanic material, which systems may include a mafic mineral-containing vertical column configured to receive a divalent cation-containing solution into a bottom portion thereof; a first reaction vessel configured to receive a proton-removing agent from a source of proton-removing agent and the divalent cation-containing solution from a top portion of the vertical column; a first liquid-solid separator configured to receive a first precipitation material from the first reaction vessel, and a spray dryer configured to receive the first precipitation material from the first liquid-solid separator. The reaction vessel, in some embodiments, may be further configured to receive a carbonate promoter. The spray dryer may also be configured to receive an exhaust gas, and the vertical column may be configured to receive the exhaust gas from the spray dryer. In some embodiments, a second liquid-solid separator is in fluid communication between the top portion of the vertical column and the first reaction vessel. In some of these embodiments, the system may further comprise a precipitation material washer configured to receive a second precipitation material from the second liquid-solid separator. The system may further comprise a second reaction vessel configured to receive the divalent cation-containing solution from the first liquid-solid separator, and in some of these embodiments, may further comprise a second liquid-solid separator configured to receive a second precipitation material from the second reaction vessel.

DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

Figure 8:

FIG. 8 provides SEM images of precipitation material of Example 4 at 2.5 k (left) and 4.0 k magnifications, displaying rod morphology (nesquehonite) and amorphous silica gel.

Figure 9:
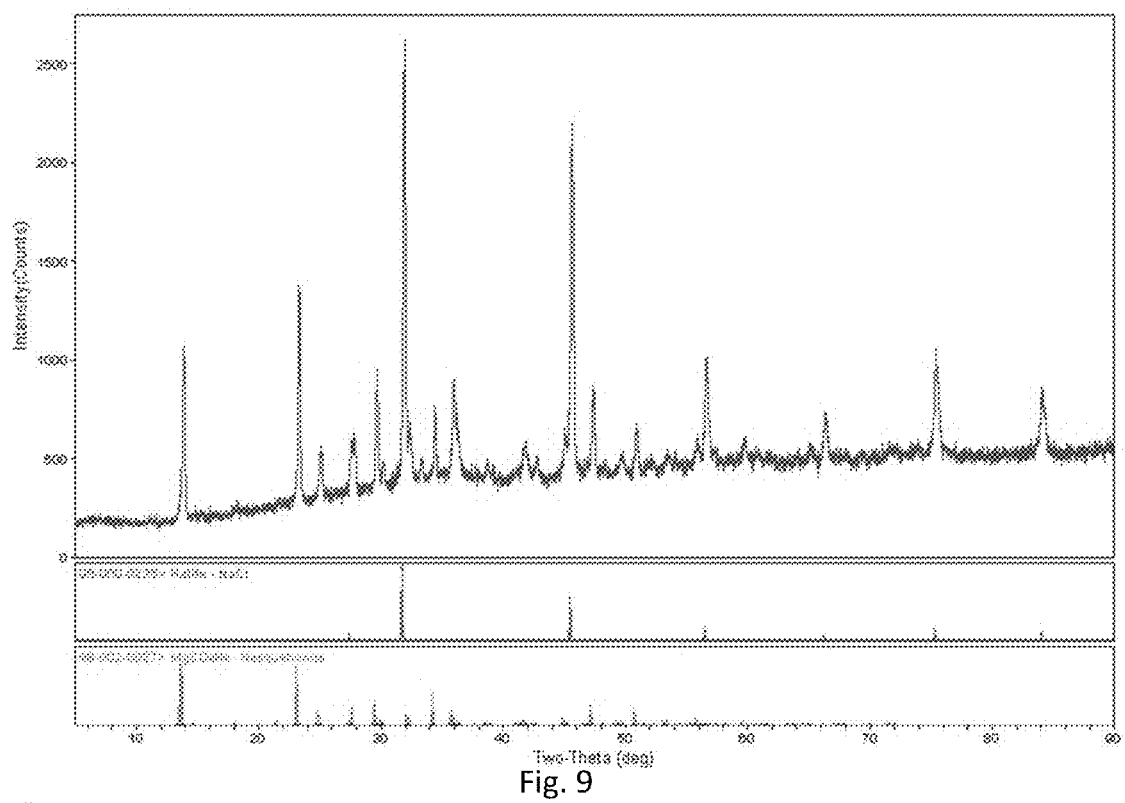

FIG. 9 provides an XRD diffractogram of precipitation material (top diffractogram), halite (middle diffractogram), and nesquehonite (bottom diffractogram) of Example 4

Figure 10:
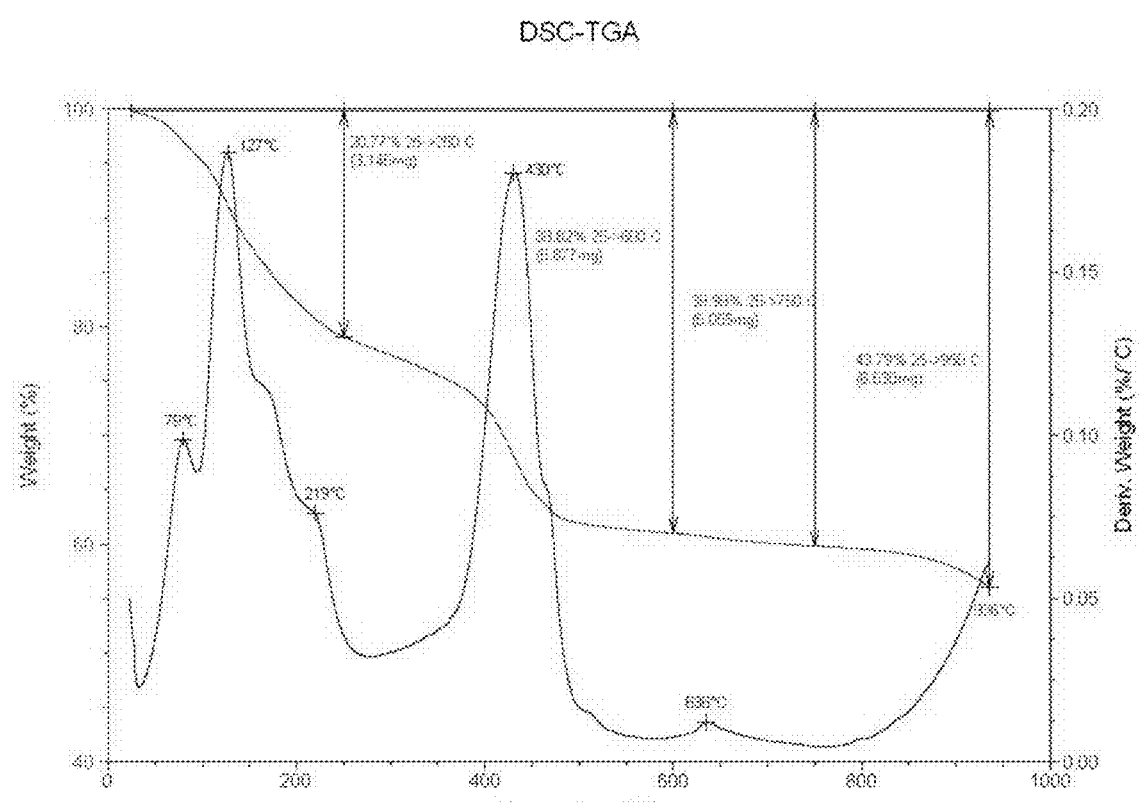

FIG. 10 provides a TGA thermogram of precipitation material of Example 4.

Figure 11:
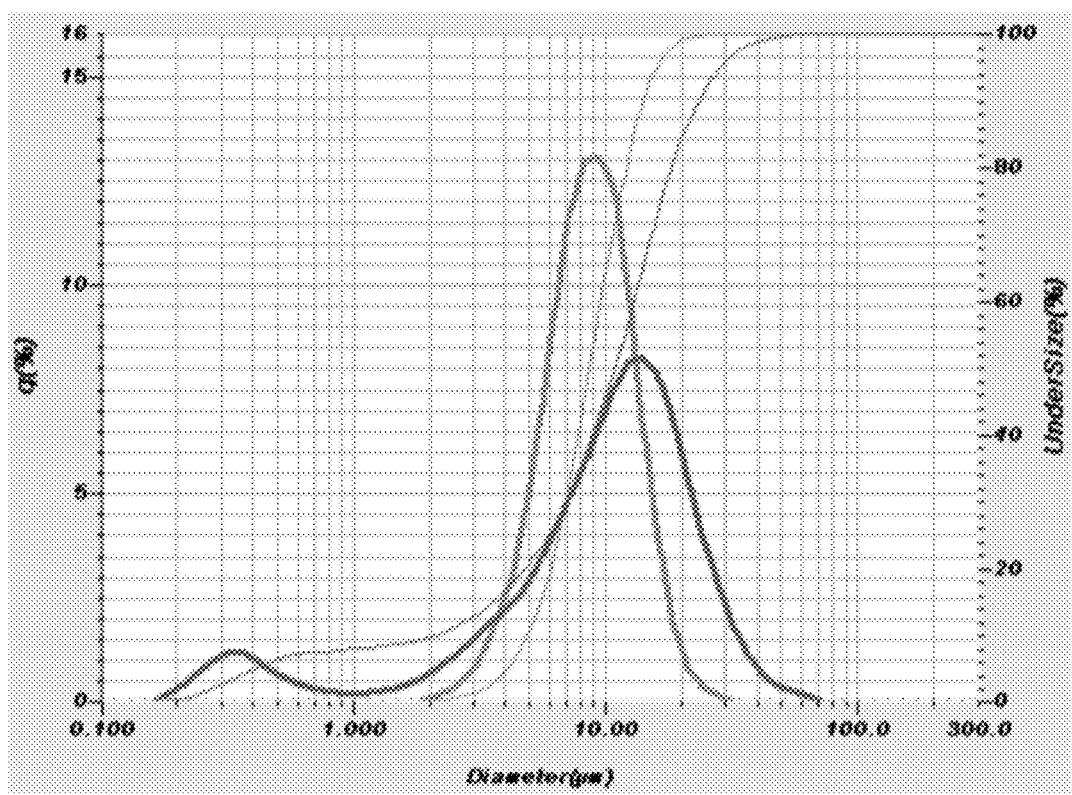

FIG. 11 provides a graph of particle size distributions for Type II/V Portland cement and Portland cement blended with precipitation material of Example 5.

DESCRIPTION

Before the invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are now described.

All publications, patents, and patent applications mentioned in this specification are incorporated herein by reference to the same extent as if each individual publication, patent, or patent application was specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

Materials used to produce compositions of the invention are described first in a section with particular attention to sources of $CO_2$, divalent cations, and proton-removing agents (and methods of effecting proton removal). A description of material comprising metal silicates and/or related materials that may be used in the invention is also provided in the section on materials. Methods by which materials (e.g., $CO_2$, divalent cations, etc.) may be incorporated into compositions of the invention are described next. Subsequently, systems of the invention are described followed by description of compositions of the invention, products comprising those compositions, and used thereof. Subject matter is organized as a convenience to the reader and in no way limits the scope of the invention. For example, should a particular material comprising metal silicates be disclosed or described in a section (e.g., the section on methods) other than the section on material comprising metal silicates, it should be understood that the particular material comprising metal silicates is part of the material comprising metal silicates disclosure. Continuing with the same example, it should be understood that the section on material comprising metal silicates is not exhaustive and that additional material comprising metal silicates may be used in the invention without departing from the spirit and scope of the invention.

Materials

As described in further detail below, the invention utilizes a source of $CO_2$, a source of proton-removing agents (and/or methods of effecting proton removal), and a source of divalent cations to produce precipitation material. Material comprising metal silicates (e.g., olivine, serpentine, and materials further described below) and/or related materials may provide, in whole or in part, the source of divalent cations. As such, material comprising metal silicates may be the sole source of divalent cations for preparation of the compositions described herein. Metal silicates and/or related materials may also be used in combination with supplemental sources of divalent cations for preparation of the compositions described herein. Material comprising metal silicates (e.g., olivine, serpentine, and materials further described below) and/or related materials may also provide, in whole or in part, the source of proton-removing agents. As such, material comprising metal silicates may be the sole source of proton-removing agents for preparation of the compositions described herein. Metal silicates and/or related materials may also be used in combination with supplemental sources of proton-removing agents for preparation of the compositions described herein. In some embodiments, metal silicates are not a source of proton-removing agents. In such embodiments, proton-removing agents described herein or combinations those proton-removing agents are the source of proton-removing agents for the preparation of the compositions described herein. Carbon dioxide sources, supplemental divalent cation sources, and proton-removing sources (and methods of effecting proton removal), which proton-removing sources may be provided as a supplemental source, will first be described to give context to material comprising metal silicates as sources of divalent cations. Material comprising metal silicates (e.g., olivine, serpentine, etc.) will then be described, followed by methods in which material comprising metal silicates is used to produce compositions comprising carbonates, compositions comprising silica, or combinations thereof.

Carbon Dioxide

Methods of the invention include contacting a volume of an aqueous solution of divalent cations with a source of $CO_2$, then subjecting the resultant solution to precipitation conditions. Method of the invention further include contacting a volume of an aqueous solution of divalent cations with a source of CO2 while subjecting the aqueous solution to precipitation conditions. There may be sufficient carbon dioxide in the divalent cation-containing solution to precipitate significant amounts of carbonate-containing precipitation material (e.g., from seawater); however, additional carbon dioxide is generally used. The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source is a waste gas stream (i.e., a by-product of an active process of the industrial plant) such as exhaust from an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like. Combustion gas from any convenient source may be used in methods and systems of the invention. In some embodiments, combustion gases in post-combustion effluent stacks of industrial plants such as power plants, cement plants, and coal processing plants is used.

Thus, the waste streams may be produced from a variety of different types of industrial plants. Suitable waste streams for the invention include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, waste streams suitable for systems and methods of the invention are sourced from a coal-fired power plant, such as a pulverized coal power plant, a supercritical coal power plant, a mass burn coal power plant, a fluidized bed coal power plant; in some embodiments the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and $NO_2$), SOx (monosulfur oxides: SO, $SO_2$ and $SO_3$), VOC (volatile organic compounds), heavy metals such as mercury, and particulate matter (particles of solid or liquid suspended in a gas). Flue gas temperature may also vary. In some embodiments, the temperature of the flue gas is from 0° C. to 2000° C., such as from 60° C. to 700° C., and including 100° C. to 400° C.

In some embodiments, one or more additional components are precipitated or trapped in precipitation material formed by contacting the waste gas stream comprising these additional components with an aqueous solution comprising divalent cations (e.g., alkaline earth metal ions such as $Ca^{2+}$ and $Mg^{2+}$). Sulfates and/or sulfites of calcium and magnesium may be precipitated or trapped in precipitation material (further comprising calcium and/or magnesium carbonates) produced from waste gas streams comprising SOx (e.g., $SO_2$). Magnesium and calcium may react to form $MgSO_4$, $CaSO_4$, respectively, as well as other magnesium-containing and calcium-containing compounds (e.g., sulfites), effectively removing sulfur from the flue gas stream without a desulfurization step such as flue gas desulfurization ("FGD"). In addition, $CaCO_3$, $MgCO_3$, and related compounds may be formed without additional release of $CO_2$. In instances where the aqueous solution of divalent cations contains high levels of sulfur compounds (e.g., sulfate), the aqueous solution may be enriched with calcium and magnesium so that calcium and magnesium are available to form carbonate compounds after, or in addition to, formation of $CaSO_4$, $MgSO_4$, and related compounds. In some embodiments, a desulfurization step may be staged to coincide with precipitation of carbonate-containing precipitation material, or the desulfurization step may be staged to occur before precipitation. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, sulfates, etc.) is collected. In step with these embodiments, other components, such as heavy metals (e.g., mercury, mercury salts, mercury-containing compounds), may be trapped in the carbonate-containing precipitation material or may precipitate separately.

A portion of the gaseous waste stream (i.e., not the entire gaseous waste stream) from an industrial plant may be used to produce precipitation material. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material. In these embodiments, 80% or more, such as 90% or more, including 95% or more, up to 100% of the gaseous waste stream (e.g., flue gas) generated by the source may be employed for precipitation of precipitation material.

Although industrial waste gas offers a relatively concentrated source of combustion gases, methods and systems of the invention are also applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material. In these cases, the concentration of pollutants, e.g., $CO_2$, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

Divalent Cations

As disclosed above, material comprising metal silicates (e.g., olivine, serpentine), described in detail in a respective section below, may be the sole source of divalent cations for preparation of the compositions described herein; however, material comprising metal silicates may also be used in combination with supplemental sources of divalent cations as described in this section.

Methods of the invention include contacting a volume of an aqueous solution of divalent cations with a source of $CO_2$ and subjecting the resultant solution to precipitation conditions. In some embodiments, a volume of an aqueous solution of divalent cations is contacted with a source of CO2 while subjecting the aqueous solution to precipitation conditions. In addition to divalent cations sourced from material comprising metal silicates, divalent cations may come from any of a number of different divalent cation sources depending upon availability at a particular location. Such sources include industrial wastes, seawater, brines, hard waters, minerals (e.g., lime, periclase), and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety, may be used in combination with material comprising metal silicates to provide, for example, divalent cations for the invention.

In some locations, a convenient source of divalent cations for use in systems and methods of the invention is water (e.g., an aqueous solution comprising divalent cations such as seawater or surface brine), which may vary depending upon the particular location at which the invention is practiced. Suitable aqueous solutions of divalent cations that may be used include solutions comprising one or more divalent cations, e.g., alkaline earth metal cations such as $Ca^{2+}$ and $Mg^{2+}$. In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater, any of which may be naturally occurring or anthropogenic. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cation are derived is an anthropogenic brine selected from a geothermal plant wastewater or a desalination wastewater.

Freshwater is often a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from Na+ and K+ are added to freshwater. In some embodiments, freshwater comprising $Ca^{2+}$ is combined with combustion ash (e.g., fly ash, bottom ash, boiler slag), or products or processed forms thereof, yielding a solution comprising calcium and magnesium cations.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing precipitation material. If desired, the water may be cooled prior to entering the precipitation system. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity. If desired, such systems may be modified to include security measures (e.g., to detect tampering such as addition of poisons) and coordinated with governmental agencies (e.g., Homeland Security or other agencies). Additional tampering or attack safeguards may be employed in such embodiments.

Proton-Removing Agents and Methods

Material comprising metal silicates may be used in combination with other sources of proton-removing agents (and methods for effecting proton removal) as described in this section.

Methods of the invention include contacting a volume of an aqueous solution of divalent cations with a source of $CO_2$ (to dissolve $CO_2$) and subjecting the resultant solution to precipitation conditions. In some embodiments, a volume of an aqueous solution of divalent cations is contacted with a source of CO2 (to dissolve CO2) while subjecting the aqueous solution to precipitation conditions. The dissolution of $CO_2$ into the aqueous solution of divalent cations produces carbonic acid, a species in equilibrium with both bicarbonate and carbonate. In order to produce carbonate-containing precipitation material, protons are removed from various species (e.g. carbonic acid, bicarbonate, hydronium, etc.) in the divalent cation-containing solution to shift the equilibrium toward carbonate. As protons are removed, more $CO_2$ goes into solution. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to accelerate precipitation of precipitation material.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from sea water (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is hereby incorporated by reference in its entirety. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088,242, filed 23 Dec. 2008; International Patent Application No. PCT/US09/32301, filed 28 Jan. 2009; and International Patent Application No. PCT/US09/48511, filed 24 Jun. 2009, each of which are incorporated herein by reference in their entirety.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. 61/081,299 and U.S. 61/091,729, the disclosures of which are herein incorporated by reference.

Material Comprising Metal Silicates

As disclosed above, and in further detail below, the invention utilizes a source of $CO_2$, a source of proton-removing agents (and/or methods of effecting proton removal), and a source of divalent cations. Material comprising metal silicates (e.g., metal silicates such as serpentine and olive; rock comprising metal silicates) may provide a source of divalent cations (e.g., $Ca^{2+}$, $Mg^{2+}$), a source of proton-removing agents (e.g., metal oxides such as CaO and MgO; metal hydroxides such as $Ca(OH)_2$ and $Mg(OH)_2$), or both. Furthermore, material comprising metal silicates may provide silica content to compositions of the invention. In some embodiments, material comprising metal silicates provides the sole source of divalent cations for preparation of the compositions described herein. In some embodiments, material comprising metal silicates is used in combination with supplemental sources of divalent cations. Likewise, in some embodiments, material comprising metal silicates provides the sole source of proton-removing agents for preparation of the compositions described herein. In some embodiments, material comprising metal silicates is used in combination with supplemental sources of proton removing agents. In some embodiments, material comprising metal silicates provide the sole source of divalent cations and proton-removing agents for preparation of the composition described herein. For example, in some embodiments, a serpentine mineral such as chrysotile may be a source of hydroxide. In such embodiments, the material comprising metal silicates (e.g., serpentine) may be digested or dissolved in water. To effect optimal digestion or dissolution, the material comprising the metal silicate may be comminuted and/or sonicated in solution. The material comprising the metal silicate may also just sit in solution for an amount of time (e.g., days, month, years). In some embodiments, material comprising metal silicates is used in combination with a supplemental source of divalent cations and a supplemental source proton-removing agents. In some embodiments, the silica present in compositions of the invention is provided by material comprising metal silicates or a combination of materials comprising metal silicates with supplemental sources of silica (e.g., fly ash, cement kiln dust, and/or other anthropogenic sources). Methods by which materials comprising metal silicates are used, alone or in combination with other sources of divalent cations and proton-removing agents are further described below.

Rock, naturally occurring solid aggregate comprising minerals and/or mineraloids, is suitable and often convenient for the invention, particularly rock comprising magnesium and/or calcium (e.g., peridotite, basalt, gabbro, diabase, etc.) that, upon processing (e.g., size reduction, digestion), provides divalent cations such as $Mg^{2+}$ and/or $Ca^{2+}$. Rock may also provide silica content to compositions of the invention as well. Minerals, which have characteristic compositions with highly ordered atomic structure and distinct physical properties, are generally more suitable for the invention. As with rock, minerals comprising magnesium and/or calcium may provide divalent cations such as $Mg^{2+}$ and/or $Ca^{2+}$ for the invention upon processing. Minerals comprising magnesium and/or calcium may also provide silicates (e.g., metal silicates, which contain at least one metal along with silicon such as such as calcium silicates, magnesium silicates, aluminosilicates, iron-bearing silicates, and mixtures thereof) that, upon processing, provide silica to compositions of the invention, which compositions exhibit pozzolanic properties. In some embodiments, minerals are processed for their silica-providing content alone; that is to say, in some embodiments, material comprising metal silicates with low or negligible amounts of calcium and/or magnesium (which yield divalent cations such as $Ca^{2+}$ and/or $Mg^{2+}$) are processed for the silica-providing content. As rock may be used in the invention, it should be understood that pure or impure minerals are suitable for the invention.

Many different materials comprising metal silicates are suitable for use in the invention, including naturally occurring materials comprising metal silicates such as those present in rocks, minerals, and mineral-rich clays. Metal silicates that may be used in the invention include, but are not limited to, orthosilicates, inosilicates, phyllosilicates, and tectosilicates. Orthosilicates include, for example, olivine group minerals $((Mg,Fe)_2SiO_4)$, wherein olivine minerals richer in magnesium (i.e., closer to forsterite $(Mg_2SiO_4)$ as opposed to fayalite $(Fe_2SiO_4)$) are generally preferred. Inosilicates ("chain silicates") include, for example, single chain inosilicates such as pyroxene group minerals $(XY(Si,Al)_2O_6)$, wherein X represents ions of calcium, sodium, iron (e.g., $Fe^{2+}$), or magnesium and Y represents ions of smaller size, such as chromium, aluminum, iron (e.g., $Fe^{3+}$, even $Fe^{2+}$), magnesium, manganese, scandium, titanium, and vanadium, and wherein pyroxene group minerals richer in magnesium are generally preferred (e.g., closer to institute $(Mg_2Si_2O_6)$ as opposed to ferrosilite $(Fe_2Si_2O_6)$). Single chain inosilicates also include, for example, pyroxenoid group minerals such as wollastonite $(CaSiO_3)$, commonly in contact-metamorphosed limestone, and pectolite $(NaCa_2(Si_3O_8)(OH))$, which are also suitable for use in the invention. Double chain inosilicates include, for example, amphibole group minerals such as anthophyllite $((Mg,Fe)_7Si_8O_{22}(OH)_2)$. Phyllosilicates (i.e., sheet silicates) include, for example, serpentine group minerals (e.g., antigorite, chrysotile, and/or lizardite polymorphs of serpentine $((Mg,Fe)_3Si_2O_5(OH)_4))$, phyllosilicate clay minerals (e.g., montmorillonite $(Na,Ca)_{0.33}(Al,Mg)_2(Si_4O_{10})(OH)_2 \cdot nH_2O$ and talc $Mg_3Si_4O_{10}(OH)_2)$, and mica group minerals (e.g., biotite $K(Mg,Fe)_3(AlSi_3O_{10})(OH)_2)$. Tectosilicates (i.e., framework silicates), which are aluminosilicates (with the exception of quartz group minerals), include, for example, plagioclase feldspars such as labradorite $((Na,Ca)(Si,Al)_4O_8$ (Na:Ca 2:3) and anorthite $(CaAl_2Si_2O_8)$.

Mafic and ultramafic minerals (i.e., silicate-containing minerals rich in magnesium and iron, sometimes referred to as magnesium silicates) having less than 52% $SiO_2$ and less than 45% $SiO_2$, respectively, are a subset of some of the metal silicates described above. As such, mafic minerals and ultramafic (i.e., generally >18% MgO, high Foe content, low potassium content) minerals, and products or processed forms thereof, are also suitable for use in the invention. Mafic and ultramafic rocks (generally >90% mafic minerals), which comprise mafic and ultramafic minerals, are suitable for the invention as well. Such rocks include, but are not limited to, pyroxenite, troctolite, dunite, peridotite, basalt, gabbro, diabase, and soapstone. Common rock-forming mafic minerals include olivine, pyroxene, amphibole, biotite. Significant masses of olivine- and serpentine-bearing rocks exist around the world, particularly in ultramafic complexes, and in large serpentinite bodies. Serpentine is an abundant naturally occurring mineral having minor amounts of elements such as chromium, manganese, cobalt and nickel. As such, serpentine may refer to any of 20+ varieties belonging to the serpentine group. Olivine is a naturally occurring magnesium-iron silicate $((Mg,Fe)_2SiO_4)$, which ranges from forsterite (Fo) $(Mg_2SiO_4)$ to fayalite (Fa) $(Fe_2SiO_4)$. As such, olivine may be, for example, $Fo_{70}Fa_{30}$, wherein the subscript indicates the molar ratio of forsterite (Fo) to fayatite (Fa). Generally, olivine richer in forsterite is preferred. Owing to structure, the olivine group also includes monticellite $(CaMgSiO_4)$ and kirschsteinite $(CaFeSiO_4)$. Wollastonite is a naturally occurring calcium silicate that is also convenient for the invention.

Systems and Methods

Provided are methods for producing carbonate-containing compositions comprising silica from a source of carbon dioxide, a divalent cation-containing solution, and a source of proton-removing agents. Also provided are methods for producing carbonate-containing compositions comprising little or no silica. In such methods, silicon-based material (e.g., silica, unreacted or undigested silicate, etc.) may be separated at an early point in the method and processed separately from carbonate-containing compositions. Silicon-based material and carbonate-containing material may be blended at a later stage to produce a composition with a particular ratio of components. Carbonate-compositions comprising silica may be further processed and blended with, for example, Portland cement.

Figure 1:
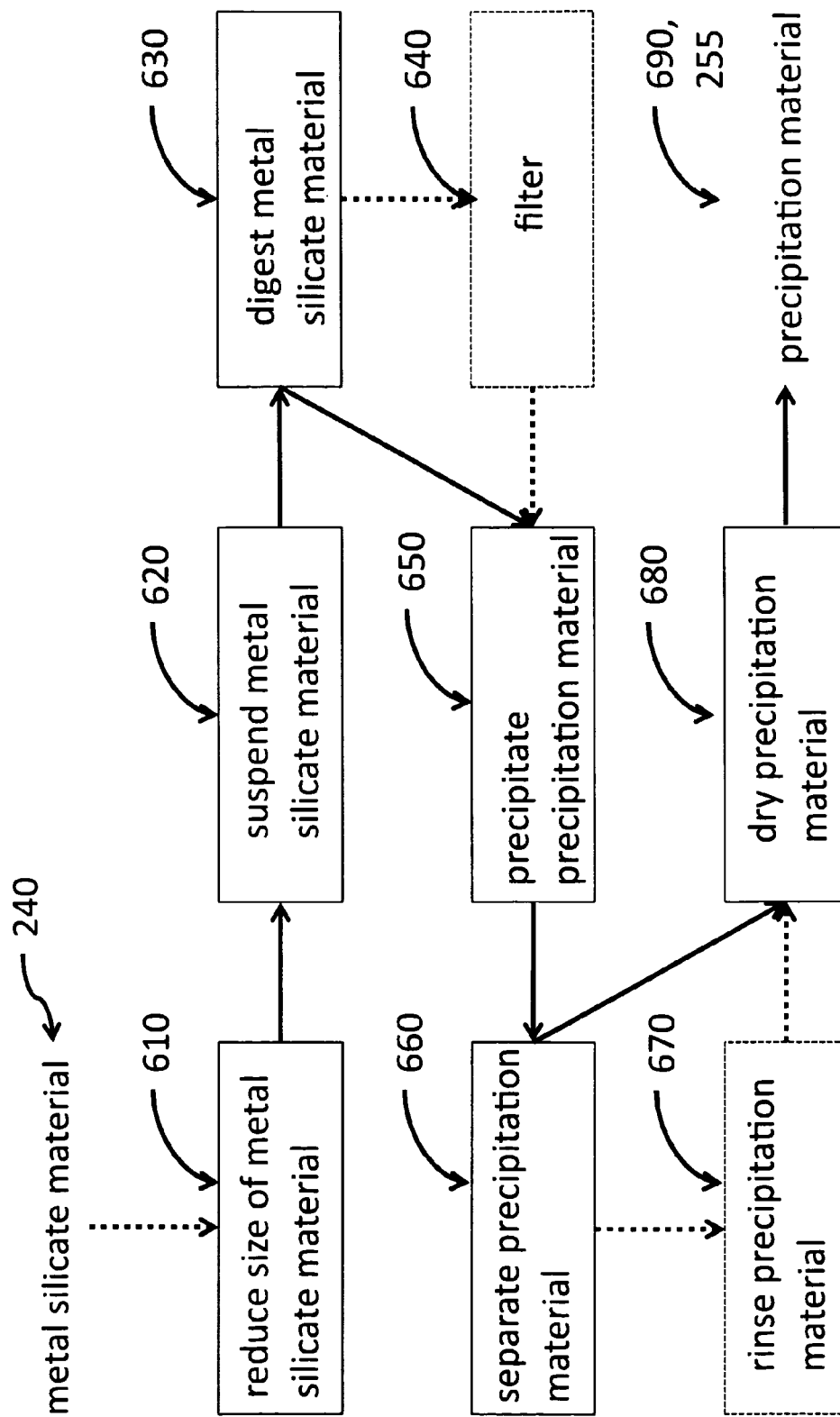
FIG. 1 illustrates a method for producing precipitation material from material comprising metal silicates.

FIG. 1 illustrates a general sequence of steps by which carbonate-containing precipitation material (690, 255) may be prepared from material comprising metal silicates (240), which steps are discussed in further detail in the following paragraphs. The particle size of initial material comprising metal silicates may first be reduced in size (i.e., comminuted) as in step 610, using a combination of crushing, grinding, and sieving, which process may be performed iteratively to produce material comprising metal silicates of a consistent particle size. Comminuted material comprising metal silicates may then be suspended in an aqueous solution as in step 620, which solution generally comprises a portion of the divalent cations that will end up in precipitation material of the invention. As described below, the concentration of comminuted material comprising metal silicates in the suspension may be anywhere from 1 and 1280 g/L. After suspension of the comminuted material comprising metal silicates, the material comprising metal silicates is digested as in step 630. Digestion of the material comprising metal silicates, which includes, but is not limited to, dissolution of the material comprising metal silicates, may be done to any desired extent.

As such, digestion conditions (e.g., temperature, mode of agitation (if any), time, etc.) may vary as described below. Digestion, for example, may be performed under ambient conditions (i.e., room temperature and pressure). After digestion of the material comprising metal silicates, the resultant digestion mixture may be optionally filtered in a filter step (640) to remove silica and/or undigested silicon-based material. As the concentration of silica and other silicon-based products of digestion may increase at a faster rate than the concentration of divalent cations, it may be advantageous to filter silica and other silicon-based products to optimize extraction of divalent cations. Precipitation material may then be produced in a precipitation step (650) from digested material comprising metal silicates or an aqueous solution thereof, which comprises divalent cations, and, depending upon the extent of filtration, silica and/or other silicon-based material. As described in additional detail herein, precipitation of precipitation material further involves introducing $CO_2$ and, if the solution is not already basic, one or more proton-removing agents (or methods of effecting proton removal). Precipitation material, upon formation, may then be separated from the precipitation reaction mixture in a separation step (660), which may involve a liquid-solid separator as described in further detail below. After separation, the precipitation material may be optionally rinsed in a rinsing step (670) to remove, for example, soluble chlorides, sulfate, nitrates, and/or the like. Whether newly separated in separation step 660 or freshly rinsed as in rinsing step 670, the precipitation material may be dried. Drying step 680 may include reconstituting precipitation material such that a slurry of the precipitation material may be fed into a spray dryer and dried to a consistent size, producing dried precipitation material 690, which precipitation material may be pozzolanic material 255.

Generally, material comprising metal silicates (e.g., rock comprising metal silicate minerals) has a wide range of initial particle sizes. As such, it is desirable to comminute the starting material comprising metal silicates, which comminution may be achieved with any suitable apparatus or combination of apparatus. Size reduction of starting material comprising metal silicates may begin with crushing. Crushed material comprising metal silicates may then be reduced to a smaller particle size by grinding. Grinding may include use of a mill such as a jet mill or ball mill. Ground material comprising metal silicates may then be subsequently screened (e.g., by sieve, cyclone, etc.) to select for material comprising metal silicates within a particular size distribution range. Screened material comprising metal silicates falling outside the particular size distribution range may be passed back into the grinder and further ground. Screened material comprising metal silicates falling within the particular size distribution range may be directly used (i.e., advanced to digestion of the silicate material) or, optionally, passed on to further processing in an iterative process. In some embodiments, the particle size of the material comprising metal silicates may be reduced to an average diameter of less than 10,000, less than 1000, less than 750, less than 500, less than 400, less than 300, less than 200, less than 100, less than 75, less than 50, less than 25, or less than 10 microns. Further processing of the screen-selected material comprising metal silicates may include magnetic separation to separate magnetic material such as magnetite ($Fe_3O_4$) followed by optional heat treatment.

Digestion of metal silicates (e.g., mafic and ultramafic minerals such as olivine and serpentine; wollastonite) and/or related materials may be achieved using any convenient protocol, wherein the protocol provides divalent cations, silicon-based material, and, in some embodiments, proton-removing agents for use in the invention. Digestion of material comprising metal silicates may occur in a solvent such as water (e.g., deionized water, distilled water) or a divalent cation-containing aqueous solution such as freshwater, brackish water, seawater, or brine (naturally occurring or anthropogenic brines). The aqueous solution, whether naturally occurring or from an anthropoid source, generally comprises at least a portion of divalent cations for use with the invention. Furthermore, the aqueous solution may be acidic or basic, exposure to which may accelerate digestion of material comprising metal silicates. Digestion may also be accelerated by increasing surface area, such as by particle size reduction (described above), as well as by use of, for example, ultrasonic techniques (e.g., inertial cavitations). Material comprising metal silicates may be contacted with the divalent cation-containing solution in a variety of processes, including batch, semi-batch, and continuous processes to produce a slurry comprising silicon-containing material. For example, the mafic mineral may be mixed with a divalent cation-containing solution in a tank, which solution may be stirred or otherwise agitated. After a period, the slurry is withdrawn from the tank, and the tank is recharged with fresh material comprising metal silicates and divalent cation-containing solution. In some embodiments, the reaction may occur in one or more continuous stirred tank reactors in a continuous flow process. In some embodiments, material comprising metal silicates is disposed within a packed column and the divalent cation-containing solution is percolated through the disposed material comprising metal silicates. In some embodiments, slurry comprising divalent cations and silicon-containing material is continuously withdrawn from the top of a vertical column, wherein the vertical column is packed with material comprising metal silicates.

In some embodiments, material comprising metal silicates, in whole or in part, provides a source of proton-removing agents. As such, material comprising metal silicates may be the sole source of proton-removing agents for preparation of the compositions described herein. Material comprising metal silicates may also be used in combination with supplemental sources of proton-removing agents for preparation of the compositions described herein. As above, digestion of material comprising metal silicates may occur in a solvent such as water or an aqueous solution such as freshwater, brackish water, seawater, or brine. The aqueous solution, whether naturally occurring or from an anthropogenic source, generally comprises at least some divalent cations for use with the invention and may be basic. Digestion of material comprising metal silicates in such aqueous solutions provides the aqueous solutions with additional divalent cation and/or proton-removing agents.

In some embodiments, material comprising metal silicates, in whole or in part, provides a source of silica for pozzolanic material of the invention. As such, material comprising metal silicates may be the sole source of silica for preparation of the compositions described herein. Material comprising metal silicates may also be used in combination with supplemental sources of silica for preparation of the compositions described herein. Digestion of material comprising metal silicates may occur in a solvent such as water or an aqueous solution, after which, undigested material comprising metal silicates and/or insoluble silicon-based material (e.g., excess silica) may be removed. Undigested material comprising metal silicates and/or insoluble silicon-based material (e.g., excess silica) may be discarded later, or, in some embodiments, combined with carbonate-containing precipitation material, which material may already be pozzolanic material (provided enough silica dissolved during digestion). Depending upon the amount of amorphous silica in the carbonate-containing precipitation material, other siliceous products may be incorporated, including, but not limited to volcanic ash, fly ash, silica fume, high reactivity metakaolin, and ground granulated blast furnace slag.

Concentration of material comprising metal silicates for digestion may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, 640 and 1280 g/L, or a range thereof, in water or an aqueous solution (e.g., freshwater, brackish water, seawater, or brine). For example, in some embodiments, the concentration of material comprising metal silicates for digestion may be between 1 and 40 g/L, 10 and 80 g/L, 20 and 160 g/L, 40 and 320 g/L, 80 and 640 g/L, or 160 and 1280 g/L. Temperature may be adjusted to optimize material comprising metal silicates digestion. In some embodiments, material comprising metal silicates is digested between room temperature (about 70° F.) to 220° F. In some embodiments, material comprising metal silicates is digested within one or more temperature ranges selected from 70-100° F., 100-220° F., 120-220° F., 140-220° F., 160-220° F., 100-200° F., 100-180° F., 100-160° F., and 100-140° F. Should auxiliary heat be needed to increase temperature, waste heat from, for example, flue gas may be used. Other external sources of heat (e.g., heated water) may be used as well. Digestion time may also be adjusted to optimize material comprising metal silicates digestion. In some embodiments, material comprising metal silicates is digested between 1 hour and 200 hours. In some embodiments, material comprising metal silicates is digested within 1 hour and 2 hours, 2 hours and 4 hours, 4 hours and 6 hours, 6 hours and 8 hours, 8 hours and 10 hours, 10 hours and 20 hours, 20 hours and 40 hours, 40 hours and 60 hours, 60 hours and 80 hours, 80 hours and 100 hours, 100 hours and 150 hours, 150 hours and 200 hours, or a range thereof. For example, in some embodiments, material comprising metal silicates is digested between 1 and 10 hours, 2 and 20 hours, 4 and 80 hours, 10 and 150 hours, or more than 150 hours. Material comprising metal silicates digestion may be further optimized by including chelates that accelerate digestion kinetics. Examples of chelates that may be used in the invention include, but are not limited to, acids such as acetic acid, ascorbic acid, citric acid, dicarboxymethylglutamic acid, malic acid, oxalic acid, phosphoric acid, and succinic acid; amino acids; siderophores such as ferrichrome, desferrioxamine B, desferrioxamine E, fusarinine C, omibactin, enterobactin, bacillibactin, vibriobactin, azotobactin, pyoverdine, and yersiniabactin; EDTA; EGTA; EDDS; and NTA.

In some embodiments, proton-removing agents such as metal hydroxides (e.g., $Mg(OH)_2$, $Ca(OH)_2$) may be made available for use by digestion of one or more materials comprising metal silicates (e.g., olivine and serpentine) with aqueous alkali hydroxide (e.g., NaOH) or any other suitable caustic material. Any suitable concentration of aqueous alkali hydroxide or other caustic material may be used to decompose material comprising metal silicates, including highly concentrated and very dilute solutions. The concentration (by weight) of an alkali hydroxide (e.g., NaOH) in solution may be, for example, from 30% to 80% and from 70% to 20% water. In some embodiments, the digestion of material comprising metal silicates and/or other rocks and minerals is achieved over a pH range, which pH range includes pH 6.9 to pH 7.5, pH 7.5 to pH 8.0, pH 8.0 to pH 8.5, pH 8.5 to pH 9.0, pH 9.0 to pH 9.5, pH 9.5 to pH 10.0, pH 10.0 to pH 10.5, pH 10.5 to pH 11.0, pH 11.0 to pH 11.5, pH 11.5 to pH 12.0, pH 12.0 to pH 12.5, pH 12.5 to pH 13.0, pH 13.0 to pH 13.5, and pH 13.5 to pH 14.0. For example, in some embodiments, digestion of material comprising metal silicates is achieved between pH 6.9 and pH 8.0, pH 6.9 and pH 9.0, pH 8.0 and pH 10.0, pH 8.0 and pH 11.0, pH 8.0 and pH 12.0, or pH 9.0 and pH 14.0. For example, olivine may be digested in an aqueous solution with a pH ranging between pH 7.0 and pH 9.0, the pH resulting from dissolution of a proton-removing agent. Because solubility of silica increases at higher pH, pozzolanic material of the invention resulting from such metal silicate digestion may have proportionately more silicon-based material (e.g., silica). In addition, the resultant pozzolanic material may be more reactive due to an increase amount of amorphous silica. Advantageously, material comprising metal silicates digested with aqueous alkali hydroxide may be used directly to produce precipitation material. In addition, base value from the precipitation reaction mixture may be recovered and reused to digest additional material comprising metal silicates and the like.

Material comprising metal silicates (e.g., magnesium silicates such as olivine) and/or other rocks and minerals comprising metal species of interest may also be digested in an acidic aqueous solution (e.g., HCl (aq), $H_2SO_4$ (aq), each of which is optionally from an electrochemical process) to produce, for example, a slurry comprising divalent cations (e.g., $Mg^{2+}$, $Ca^{2+}$) and silicon-based material (e.g., silica, unreacted or undigested silicate, etc.). Digestion of material comprising metal silicates (e.g., olivine) and/or other rocks and mineral of interest may be achieved by contact with an acidic solution to produce a slurry comprising $SiO_2$. An aqueous solution of divalent cations may be sufficiently acidic as received, and, in such embodiments, the aqueous solution may be used without further pH adjustment; however, in some embodiments, the aqueous solution of divalent cations is either basic or not sufficiently acidic as received. In such embodiments, the divalent cation-containing aqueous solution, or any solvent or solution for digestion of material comprising metal silicates, may be acidified. Acidification may be achieved by contact with gas, liquid (including aqueous solutions), or solid forms of either weak or strong acids, including, but not limited to, HF, HCl, HBr, HI, $H_2SO_4$, $HNO_3$, $H_3PO_4$, chromic acid, $H_2CO_3$, acetic acid, citric acid, formic acid, gluconic acid, lactic acid, oxalic acid, tartaric acid, ascorbic acid, and meldrums acid. For example, in some embodiments, material comprising metal silicates is digested in an acidic aqueous solution made acidic with aqueous HCl, wherein the aqueous HCl is from an electrochemical process. In such embodiments, the electrochemical process is a low-voltage electrochemical process as described herein. In some embodiments, material comprising metal silicates and/or other rocks and minerals are digested in an aqueous solution that has become acidic due to the addition of $CO_2$ and other components of waste gas (e.g., combustion gas from burning a fossil fuel such as flue gas from a coal-fired power plant). The acidic solution may be seawater, acidified to accelerate the digestion of material comprising metal silicates, wherein acidification is provided by bubbling gaseous $CO_2$ through the seawater, producing seawater saturated with carbonic acid. In some embodiments, the digestion of material comprising metal silicates and/or other rocks and minerals is achieved over a pH range, which pH range includes pH 7.1 to pH 6.5, pH 6.5 to pH 6.0, pH 6.0 to pH 5.5, pH 5.5 to pH 5.0, pH 5.0 to pH 4.5, pH 4.5 to pH 4.0, pH 4.0 to pH 3.5, pH 3.5 to pH 3.0, pH 3.0 to pH 2.5, pH 2.5 to pH 2.0, pH 2.0 to pH 1.5, pH 1.5 to pH 1.0, pH 1.0 to pH 0.5, and pH 0.5 to pH 0.0. For example, in some embodiments, digestion of material comprising metal silicates is achieved between pH 7.1 and pH 6.0, pH 7.1 and pH 5.0, pH 6.0 and pH 4.0, pH 6.0 and pH 3.0, pH 6.0 and pH 2.0, or pH 5.0 and pH 0.0. For example, olivine may be digested in an aqueous solution having a pH ranging between pH 4.8 and pH 7.0, the pH resulting from dissolution of $CO_2$ in the aqueous solution. A proton-removing agent is added in a subsequent step, either to the $SiO_2$-containing slurry or to the resultant solution (e.g., comprising $Ca^{2+}$ and $Mg^{2+}$) remaining after $SiO_2$ (and other silicon-based material) is removed. Addition of a proton-removing agent, if sufficient, may cause precipitation of precipitation material comprising carbonates (e.g., $CaCO_3$, $MgCO_3$). Artisans will appreciate that certain acidification methods such as adding aqueous carbonic acid or bubbling $CO_2$ through a suspension of material comprising metal silicates provides carbonate ions, which may be subsequently precipitated as carbonate-containing precipitation material. Furthermore, artisans will appreciate that selection of an appropriate acid for digestion followed by an appropriate proton-removing agent for neutralization of the resultant acidic solution may introduce ionic species that are beneficial to the precipitation material and end product. Selection of appropriate acids and proton-removing agents may also avoid formation of certain ionic species that would otherwise need to be managed using other means (e.g., rinsing, to remove NaCl from precipitation material).

An aqueous solution comprising divalent cations (e.g., alkaline earth metal cations such as $Ca^{2+}$ and $Mg^{2+}$) and, optionally, $SiO_2$ may be contacted with a source of $CO_2$ at any time before, during, or after the divalent-cation containing solution is subjected to precipitation conditions (i.e., conditions allowing for precipitation of one or more materials based on, for example, pH). Accordingly, in some embodiments, an aqueous solution of divalent cations is contacted with a source of $CO_2$ prior to subjecting the aqueous solution to precipitation conditions that favor formation of precipitation material comprising carbonate and, optionally, $SiO_2$. In some embodiments, an aqueous solution of divalent cations is contacted with a source of $CO_2$ while the aqueous solution is being subjected to precipitation conditions that favor formation of precipitation material. In some embodiments, an aqueous solution of divalent cations is contacted with a source of a $CO_2$ prior to and while subjecting the aqueous solution to precipitation conditions that favor formation of precipitation material. In some embodiments, an aqueous solution of divalent cations is contacted with a source of $CO_2$ after subjecting the aqueous solution to precipitation conditions that favor formation of precipitation material. For example, in some embodiments, an aqueous solution of divalent cations is contacted with a proton-removing agent to produce a slurry, which slurry is subsequently introduced by a droplet producing system to a horizontal contacting chamber comprising a $CO_2$-containing gas being passed therethrough. See, for example, U.S. Provisional Patent Application No. 61/223,657, filed 7 Jul. 2009, the contents of which are incorporated herein by reference. In some embodiments, an aqueous solution of divalent cations is contacted with a source of $CO_2$ before, while, and after subjecting the aqueous solution to precipitation conditions that favor formation of precipitation material. In some embodiments, a divalent cation-containing aqueous solution may be cycled more than once, wherein a first cycle of precipitation removes primarily carbonates (e.g., calcium carbonate, magnesium carbonate) and silicon-based material, and leaves an alkaline solution to which additional divalent cations may be added, wherein additional divalent cations may be added from any divalent cation source disclosed herein, including divalent cation through digestion of additional material comprising metal silicates. Carbon dioxide, when contacted with the recycled solution comprising divalent cations, allows for the precipitation of additional precipitation material, wherein the precipitation material comprises carbonates and, optionally, $SiO_2$. It will be appreciated that, in these embodiments, the aqueous solution following the first cycle of precipitation may be contacted with the $CO_2$ source before, during, and/or after divalent cations have been added. In some embodiments, an aqueous solution having no divalent cations or a low concentration of divalent cations is contacted with $CO_2$. In these embodiments, the aqueous solution may be recycled or newly introduced. As such, the order of addition of $CO_2$ and digestion of material comprising metal silicates may vary. For example, material comprising metal silicates such as serpentine, olivine, or wollastonite, each of which may provide divalent cations, $SiO_2$, or both, may be added to, for example, brine, seawater, or freshwater, followed by the addition of $CO_2$. In another example, $CO_2$ may be added to, for example, brine, seawater, or freshwater, followed by the addition of material comprising metal silicates.

A divalent cation-containing aqueous solution (optionally comprising $SiO_2$) may be contacted with a $CO_2$ source using any convenient protocol. Where the $CO_2$ is a gas, contact protocols of interest include, but are not limited to direct contacting protocols (e.g., bubbling the $CO_2$ gas through the aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, as may be convenient. In some embodiments, gas-liquid contact is accomplished by forming a liquid sheet of solution with a flat jet nozzle, wherein the $CO_2$ gas and the liquid sheet move in countercurrent, co-current, or crosscurrent directions, or in any other suitable manner. See, for example, U.S. Provisional Patent Application No. 61/158,992, filed 10 Mar. 2009, and U.S. Provisional Patent Application No. 61/178,475, filed 14 May 2009, each of which is hereby incorporated by reference in its entirety. In some embodiments, gas-liquid contact is accomplished by nebulizing a precursor to the precipitation reaction mixture such that contact is optimized between droplets of the precipitation reaction mixture precursor an a source of $CO_2$. In some embodiments, gas-liquid contact is accomplished by contacting liquid droplets of solution having an average diameter of 500 microns or less, such as 100 microns or less, with the $CO_2$ gas source. See, for example, U.S. Provisional Patent Application No. 61/223,657, filed 7 Jul. 2009, which is hereby incorporated by reference in its entirety. In some embodiments, a catalyst is used to accelerate the dissolution of carbon dioxide into solution by accelerating the reaction toward equilibrium; the catalyst may be an inorganic substance such as zinc dichloride or cadmium, or an organic substance such as an enzyme (e.g., carbonic anhydrase).

In methods of the invention, a volume of $CO_2$-charged solution produced as described above is subjected to carbonate compound precipitation conditions sufficient to produce a carbonate-containing precipitation material and a supernatant (i.e., the part of the precipitation reaction mixture that is left over after precipitation of the precipitation material). Any convenient precipitation conditions may be employed, which conditions result in production of a carbonate-containing precipitation material (optionally with $SiO_2$) from the $CO_2$-charged precipitation reaction mixture. Precipitation conditions include those that modulate the physical environment of the $CO_2$-charged precipitation reaction mixture to produce the desired precipitation material. For example, the temperature of the $CO_2$-charged precipitation reaction mixture may be raised to a point at which precipitation of the desired carbonate-containing precipitation material occurs, or a component thereof (e.g., $CaSO_4(s)$, the sulfate resulting from, for example, sulfur-containing gas in combustion gas or sulfate from seawater). In such embodiments, the temperature of the $CO_2$-charged precipitation reaction mixture may be raised to a value from 5° C. to 70° C., such as from 20° C. to 50° C., and including from 25° C. to 45° C. While a given set of precipitation conditions may have a temperature ranging from 0° C. to 100° C., the temperature may be raised in certain embodiments to produce the desired precipitation material. In certain embodiments, the temperature of the precipitation reaction mixture is raised using energy generated from low or zero carbon dioxide emission sources (e.g., solar energy source, wind energy source, hydroelectric energy source, waste heat from the flue gases of the carbon dioxide emitter, etc.). In some embodiments, the temperature of the precipitation reaction mixture may be raised utilizing heat from flue gases from coal or other fuel combustion. Pressure may also be modified. In some embodiments, the pressure for a given set of precipitation conditions is normal atmospheric pressure (about 1 bar) to about 50 bar. In some embodiments, the pressure for a given set of precipitation materials is 1-2.5 bar, 1-5 bar, 1-10 bar, 10-50 bar, 20-50 bar, 30-50 bar, or 40-50 bar. In some embodiments, precipitation of precipitation material is performed under ambient conditions (i.e., normal atmospheric temperature and pressure). The pH of the $CO_2$-charged precipitation reaction mixture may also be raised to an amount suitable for precipitation of the desired carbonate-containing precipitation material. In such embodiments, the pH of the $CO_2$-charged precipitation reaction mixture is raised to alkaline levels for precipitation, wherein carbonate is favored over bicarbonate. The pH may be raised to pH 9 or higher, such as pH 10 or higher, including pH 11 or higher. For example, when a proton-removing agent source such as fly ash is used to raise the pH of the precipitation reaction mixture or precursor thereof, the pH may be about pH 12.5 or higher.

Accordingly, a set of precipitation conditions to produce a desired precipitation material from a precipitation reaction mixture may include, as above, the temperature and pH, as well as, in some instances, the concentrations of additives and ionic species in solution. Precipitation conditions may also include factors such as mixing rate, forms of agitation such as ultrasonic agitation, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate-containing precipitation material according to the invention (from start [e.g., digestion of material comprising metal silicates] to finish [e.g., drying precipitation material or forming precipitation material into pozzolanic material]) may be batch, semi-batch, or continuous protocols. It will be appreciated that precipitation conditions may be different to produce a given precipitation material in a continuous flow system compared to a semi-batch or batch system.

Carbonate-containing precipitation material, following production from a precipitation reaction mixture, is separated from the reaction mixture to produce separated precipitation material (e.g., wet cake) and a supernatant. Precipitation material according to the invention may contain $SiO_2$; however, if silicon-based material was separated after digestion of material comprising metal silicates, the precipitation may contain very little or no $SiO_2$. The precipitation material may be stored in the supernatant for a period of time following precipitation and prior to separation (e.g., by drying). For example, the precipitation material may be stored in the supernatant for a period of time ranging from 1 to 1000 days or longer, such as 1 to 10 days or longer, at a temperature ranging from 1° C. to 40° C., such as 20° C. to 25° C. Separation of the precipitation material from the precipitation reaction mixture is achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of bulk water from the precipitation material produces a wet cake of precipitation material, or a dewatered precipitation material. As detailed in U.S. 61/170,086, filed Apr. 16, 2009, which is herein incorporate by reference, use of liquid-solid separators such as Epuramat's Extrem-Separator ("ExSep") liquid-solid separator, Xerox PARC's spiral concentrator, or a modification of either of Epuramat's ExSep or Xerox PARC's spiral concentrator, provides for separation of the precipitation material from the precipitation reaction mixture.

In some embodiments, the resultant dewatered precipitation material is then dried to produce a product (e.g., a cement, a pozzolanic cement, or a storage-stable $CO_2$-sequestering product). Drying may be achieved by air-drying the precipitation material. Where the precipitation material is air dried, air-drying may be at a temperature ranging from −70° C. to 120° C. In certain embodiments, drying is achieved by freeze-drying (i.e., lyophilization), wherein the precipitation material is frozen, the surrounding pressure is reduced, and enough heat is added to allow the frozen water in the precipitation material to sublime directly into gas. In yet another embodiment, the precipitation material is spray-dried to dry the precipitation material, wherein the liquid containing the precipitation material is dried by feeding it through a hot gas (e.g., a gaseous waste stream from the power plant), and wherein the liquid feed is pumped through an atomizer into a main drying chamber and a hot gas is passed as a co-current or counter-current to the atomizer direction. Depending on the particular drying protocol, the drying station (described in more detail below) may be configured to allow for use of a filtration element, freeze-drying structure, spray-drying structure, etc. In certain embodiments, waste heat from a power plant or similar operation may be used to perform the drying step when appropriate. For example, in some embodiments, aggregate is produced by the use of elevated temperature (e.g., from power plant waste heat), pressure, or a combination thereof.

Following separation of the precipitation material from the supernatant, the separated precipitation material may be further processed as desired; however, the precipitation material may simply be transported to a location for long-term storage, effectively sequestering $CO_2$. For example, the carbonate-containing precipitation material may be transported and placed at a long-term storage site, for example, above ground (as a storage-stable $CO_2$-sequestering material), below ground, in the deep ocean, etc.

The resultant supernatant of the precipitation process, or a slurry of precipitation material may also be processed as desired. For example, the supernatant or slurry may be returned to the source of the divalent cation-containing aqueous solution (e.g., ocean) or to another location. In some embodiments, the supernatant may be contacted with a source of $CO_2$, as described above, to sequester additional $CO_2$. For example, in embodiments in which the supernatant is to be transferred to the ocean, the supernatant may be contacted with a gaseous waste source of $CO_2$ in a manner sufficient to increase the concentration of carbonate ion present in the supernatant. As described above, contact may be conducted using any convenient protocol. In some embodiments, the supernatant has an alkaline pH, and contact with the $CO_2$ source is carried out in a manner sufficient to reduce the pH to a range between pH 5 and 9, pH 6 and 8.5, or pH 7.5 to 8.2.

In some embodiments, a method is provided comprising digesting a material comprising a metal silicate with an aqueous solution to produce divalent cations and a material comprising $SiO_2$ and reacting divalent cations with dissolved carbon dioxide to produce precipitation material. In some embodiments, the method further comprises separating the precipitation material from the supernatant with a liquid-solid separator, drying the precipitation material, processing the precipitation material to produce a construction material, or a combination thereof. As such, in some embodiments, the method further comprises separating the precipitation material from the supernatant with a liquid-solid separator. In such embodiments, the liquid-solid separator is selected from a liquid-solid separator comprising a baffle such as Epuramat's Extrem-Separator ("ExSep") liquid-solid separator. For example, in some embodiments, precipitation material is separated from precipitation reaction mixture by flowing the reaction mixture against a baffle, against which supernatant deflects and separates from particles of precipitation material, which is collected in a collector. In some embodiments, the liquid-solid separator is selected from a liquid-solid separator comprising a spiral concentrator such as Xerox PARC's spiral concentrator. For example, in some embodiments, precipitation material is separated from precipitation reaction mixture by flowing the reaction mixture in a spiral channel separating particles of precipitation material from supernatant and collecting the precipitation material in an array of spiral channel outlets. In some embodiments, the method further comprises drying the precipitation material. In such embodiments, the precipitation material may be dried to form a fine powder having a consistent particle size (i.e., the precipitation material may have a relatively narrow particle size distribution). Precipitation material, as described further herein, may have a $Ca^{2+}$ to $Mg^{2+}$ ranging from 1:1000 to 1000:1. Precipitation material comprising $MgCO_3$ may comprise magnesite, barringtonite, nesquehonite, lansfordite, amorphous magnesium carbonate, artinite, hydromagnesite, or a combination thereof. Precipitation material comprising $CaCO_3$ may comprise calcite, aragonite, vaterite, ikaite, amorphous calcium carbonate, monohydrocalcite, or combinations thereof. In some embodiments, the method further comprises processing the precipitation material to produce a construction material. In such embodiments, the construction material is an aggregate, cement, cementitious material, supplementary cementitious material, or a pozzolan.

Figure 2:
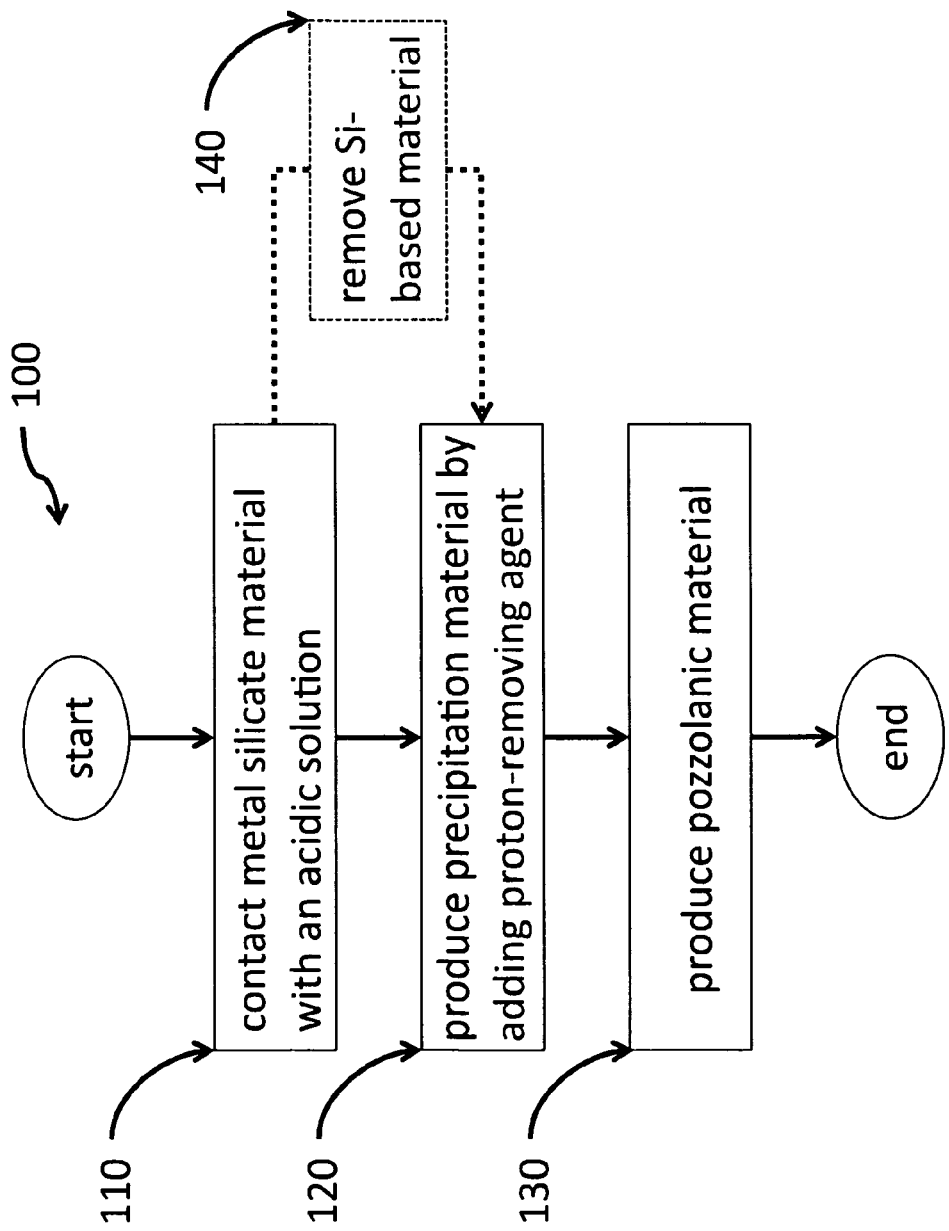
FIG. 2 shows a flowchart representation of an exemplary method for producing a pozzolanic material, according to an embodiment of the invention.

FIG. 2 provides an embodiment of a method (100) for producing precipitation material comprising carbonates and $SiO_2$, which material may be used as a pozzolanic material. The method (100) comprises a step (110) of contacting a mafic mineral with an acidic divalent cation-containing solution, then a step (120) of forming precipitation material comprising carbonates and $SiO_2$ by adding a proton-removing agent to the acidic divalent cation-containing solution used to contact the mafic mineral. Additionally, method 100 comprises a step (130) of producing a pozzolanic material from the precipitation material comprising carbonates and $SiO_2$.

As above, material comprising metal silicates (e.g., rock comprising metal silicate minerals) has a wide range of initial particle sizes. As such, it is desirable to comminute the starting material comprising metal silicates, which, in this example, is a mafic mineral. Crushing, grinding, screening the mafic mineral, followed by optional magnetic separation of screened mafic material and optional heat treatment (e.g., waste heat from flue gas) of separated mafic may be used for size reduction prior to chemical treatment (e.g., chemical digestion). In some embodiments, the mafic mineral used in step 110 has, or is reduced to, a particle size of less than 500 µm in order to increase reactivity with an acidic divalent cation-containing solution. In step 110, a slurry comprising $SiO_2$ is formed by contacting a mafic mineral with the acidic divalent cation-containing solution. Mafic minerals, as described above, are metal silicates comprising magnesium and iron, which minerals include, but are not limited to, olivine and serpentine. The mafic mineral used in step 110 may be a mixture of such mafic minerals. The mafic mineral used in step 110 may also be used in combination with, for example, mafic rocks (e.g. basalt). Further, the mafic mineral used in step 110 may be used with a waste product of an industrial process such as combustion ash, cement kiln dust, and/or slag as described in U.S. patent application Ser. No. 12/486,692, filed 17 Jun. 2009, which is herein incorporated by reference in its entirety.

In some embodiments, the mafic mineral is contacted with the divalent cation-containing solution while the solution is acidified, while in other instances, the divalent cation-containing solution is acidified before the mafic mineral is brought into contact with the solution. For example, a column packed with mafic mineral may be contacted with divalent cation-containing solution while a gas stream comprising $CO_2$ is injected at the same end of the column as the divalent cation-containing solution. Similarly, an acidic solution (e.g., HCl (aq)) may be injected at the same end of the column as the divalent cation-containing solution (with or without $CO_2$ injection). Alternatively, a divalent cation-containing solution may be contacted with a gas stream comprising $CO_2$ before the divalent cation-containing solution is brought into contact mafic mineral. Likewise, an acid in solid form or in solution may be mixed with a divalent cation-containing solution before mafic mineral is brought into contact with the divalent cation-containing solution. Acidification of divalent cation-containing solution may be similarly achieved either before or during contact between the divalent cation-containing solution and the mafic mineral where such contact is made within a tank or other reaction vessel.

Silica resulting from digestion of mafic mineral may be present as, for example, a colloidal suspension (e.g., a slurry) or a gel. The silica may be partially amorphous or wholly amorphous. In some embodiments, silica resulting from digestion of mafic mineral may be partially amorphous. In some embodiments, silica resulting from digestion of mafic mineral may be wholly amorphous. Silica may be present as silica acid or a conjugate base thereof, including species such as metasilicic acid ($H_2SiO_3$), orthosilicic acid ($H_4SiO_4$), disilicic acid ($H_2Si_2O_5$), and/or pyrosilicic acid ($H_6Si_2O_7$). Silicon species such as $H_3SiO_3$, $H_2SiO_3$, $H_4SiO_3$, and the like, may also be present. In addition to silica, slurry produced by contact of the divalent cation-containing solution with the mafic mineral may be enriched in silicates, carbonates, and various cations present in the original mafic mineral such as magnesium, aluminum, and iron cations. Small particles of the original mafic mineral and polymorphs of the mafic mineral may also be present.

In some embodiments, slurry produced in step 110 by digestion of mafic mineral is processed to separate the silicon-based material from the divalent cation-containing solution. In such embodiments, it may be desirable to separate silicon-based material because the maximum concentration of silica may be achieved before the maximum concentration of, for example, divalent cations such as magnesium. Such separation may be achieved, for example, by flocculating and/or otherwise allowing the silicon-based material to settle in a settling tank. Separation may also be achieved by a liquid-solid separation technique such as centrifuging, for example, with a hydro cyclone.

Precipitation material is formed in step 120 by raising the pH of the precipitation reaction mixture (with or without $SiO_2$) to a level sufficient for precipitation of precipitation material comprising carbonates (e.g., $MgCO_3$, $CaCO_3$). In some embodiments, the precipitation reaction mixture still includes silicon-based material such as $SiO_2$. As such, precipitation material formed in step 120 comprises carbonates as well as silicon-based material. In some embodiments, silicon-based material is removed after mafic mineral digestion in step 110. In such embodiments, the precipitation material formed in step 120 comprises carbonates with little or no silicon-based material. In either event, a proton-removing agent is added to the acidic solution comprising divalent cations to increase pH to a level sufficient to invoke precipitation of precipitation material. Proton-removing agents may be solid, solids in solution, or liquid. Solid proton-removing agents include, for example, hydroxides such as KOH or NaOH. Such hydroxides may also be used in solution (e.g., KOH (aq), NaOH(aq)) As above, proton-removing agents may further include mafic minerals (e.g., olivine, serpentine), combustion ash (e.g., fly ash, bottom ash, boiler slag), or slag (e.g., iron slag, phosphorous slag), wherein the combustion ash and slag are further described in U.S. Provisional Patent Application No. 61/073,319, filed 17 Jun. 2008, the disclosure of which is incorporated herein by reference in its entirety. In some embodiments, the mafic mineral used in step 110 is also added as the proton-removing agent in step 120. The pH of the divalent cation-containing solution may be raised in step 120 to between pH 7 and pH 12, between pH 7 and pH 10, between pH 7 and pH 9, or between pH 7 and pH 8. In some embodiments, pH of the divalent cation-containing solution is raised to pH 9 or more, pH 10 or more, pH 11 or more, pH 12 or more, or pH 13 or more, such as pH 14. In some embodiments, the step (120) of adding a proton-removing agent to the divalent cation-containing solution is performed using a separate reaction vessel from the reaction vessel used in the step (110) of dissolving mafic mineral. In some embodiments, both steps 110 and 120 are carried out sequentially using the same reaction vessel. Alternatively, protons are removed by an electrochemical process such as a low-voltage electrochemical process, as described further herein. An electrolysis process may also be used to raise pH of the precipitation reaction mixture to a level sufficient for precipitation of precipitation material. Different electrolysis processes may be used, including the Castner-Kellner process, the diaphragm cell process, and the membrane cell process. By-products of the hydrolysis product (e.g., $H_2$, sodium metal) may be collected and employed for other purposes. When a combination of proton removing agents is used, the proton-removing agents may be used in any order. For example, a divalent cation-containing solution may already be basic (e.g., seawater) before adding a proton-removing agent, or a basic solution comprising a proton-removing agent may be further basicified through addition of an additional proton-removing agent. In any of these embodiments, as described in more detail below, $CO_2$ is added before or after proton-removing agent.

As discussed in further detail below, precipitation material may comprise several mineral phases, the different mineral phases resulting from a co-precipitation process adapted to result in precipitation material comprising, for example, calcium carbonate together with magnesium carbonate. The precipitation process may also be adapted to result in a precipitation material comprising a single mineral phase including, but not limited to, calcium carbonate, magnesium carbonate, calcium magnesium carbonate (e.g., dolomite), or a ferro-carbo-aluminosilicate. Different carbonate minerals may be precipitated in sequence. For example, precipitation material comprising calcium carbonate may be precipitated in one reactor under a first set of precipitation conditions, and precipitation material comprising magnesium carbonate may be precipitated in a second reactor under a second set of precipitation conditions. In another non-limiting example, precipitation material comprising magnesium carbonate may be precipitated prior to precipitation of precipitation material comprising calcium carbonate. In some embodiments, the precipitation is adapted to produce precipitation material comprising one or more hydroxide phases (e.g., $Ca(OH)_2$, $Mg(OH)_2$). The precipitation may be configured to produce precipitation material in which any of the carbonate and hydroxide phases that are present are wholly or partially amorphous.

Step 120 optionally comprises adding a carbonate promoter to the precipitation reaction mixture. Examples of carbonate promoters include small concentrations of transition metals such as iron, cobalt, nickel, manganese, zinc, chromium, copper, barium, gold, platinum, or silver. Addition of iron (e.g., iron chloride) to the precipitation reaction mixture in a sufficient amount may raise the concentration of iron in the precipitation reaction mixture to within a range of about 0.001 part per million (ppm) to about 500 ppm. Iron, for example, is useful for promoting the formation of magnesium carbonate over the formation of magnesium hydroxide. While the term "promoter" is used herein, it will be appreciated that the iron may not be increasing the rate of the carbonate precipitation so much as inhibiting the rate of the hydroxide precipitation. The carbonate promoter may be added to the precipitation reaction mixture either before adding a proton-removing agent (or a combination of proton-removing agents), or at any time before the onset of or completion of precipitation.

Step 120 may optionally include adding additional reactants to the precipitation reaction mixture. For example, additional acids and proton-removing agents may be added to stabilize pH in a desired range. Selection of appropriate acids and proton-removing agents may result in addition of supplemental divalent cations such as $Ca^{2+}$ and $Mg^{2+}$. In addition, selection of appropriate acids and proton-removing agents may result in addition of supplemental anions such as $CO_3^{3-}$, which may serve to increase the yield of carbonate-containing precipitation material. In some embodiments, transition metal catalysts such as nickel are added in step 120 to induce the formation of larger particles during the precipitation process. In some embodiments, the pH is cycled between pH 7 and pH 10.5, alternating between bubbling $CO_2$ into the precipitation reaction mixture and adding a proton-removing agent (e.g., a soluble hydroxide compound such as potassium hydroxide (KOH) or sodium hydroxide (NaOH)).

In some embodiments, the precipitation reaction mixture comprising carbonate-containing precipitation material is processed in a step to separate the carbonate-containing precipitation material from the precipitation reaction mixture leaving a supernatant, which supernatant may comprise unused divalent cations. Such a liquid-solid separation may be accomplished, for example, by flocculating and/or allowing the precipitation material to settle in a settling tank. Liquid-solid separation may also be achieved by a liquid-solid separation technique such as centrifuging. In embodiments in which the silicon-based material from digestion of material comprising metal silicates is not separated from the divalent cation-containing solution (i.e., step 140 is not performed), the precipitation material results in a mixture of silicon-based material and carbonates (e.g., magnesium carbonate, calcium carbonate). Step 120 may also include separating this precipitation mixture (i.e., an silicon-and-carbonate-containing precipitation material) from the precipitation reaction mixture.

In step 130, pozzolanic material is produced from materials produced in accordance with the method from FIG. 2. In some embodiments, precipitation material comprising both $SiO_2$ and carbonates is dried together to form pozzolanic material. In some embodiments, where silicon-based material is separated from the divalent cation-containing solution (optional step 140), the silicon-based material and carbonate-containing precipitation material are dried separately and then mixed to form the pozzolanic material. In some embodiments, silicon-based material and carbonate-containing precipitation material are mixed when either one material, or both, are wet. In such embodiments, the subsequent wet-mixed material is then dried to produce pozzolanic material. It will be appreciated that any of the materials (e.g., silicon-based material, carbonate-containing precipitation material, silicon-and-carbonate-containing precipitation material, wet-mixed pozzolanic material) may be optionally washed with water before drying.

One method for drying the various materials (e.g., precipitation material, wet-mix pozzolanic material) is spray drying. In some embodiments, waste heat from an exhaust gas source (e.g., flue gas from a coal-fired power plant) is used for spray drying precipitation material or silicon-based material. In some embodiments, $CO_2$ from the same exhaust gas source is subsequently used to acidify a divalent cation-containing solution (e.g., as in step 110). Waste heat from exhaust gas entering the precipitation system at an elevated temperature may be advantageously recovered during spray drying, for example, as described in U.S. Provisional Patent Application No. 61/057,173, filed 29 May 2008, the disclosure of which is incorporated herein by reference in its entirety. Spray-dried materials may have particles with a spherical or low aspect ratio shape, and, in some embodiments, are sized such that at least 90% of the particles are greater than about 0.5 μm and less than about 100 μm, with a surface area between about 0.01 $m^2/g$ to about 20 $m^2/g$. In some embodiments, the dried particles are sized such that at least 75% are between 10 μm and 40 μm or between 20 μm and 30 μm, and have a surface area of about 0.5 to 5 $m^2/g$, such as 0.75 to 3.0 $m^2/g$ or 0.9 to 2.0 $m^2/g$.

In some embodiments, pozzolanic material is refined (i.e., processed) prior to subsequent use. Refinement may include any of a variety of different refinement protocols. In some embodiments, the pozzolanic material is subjected to mechanical refinement (e.g., grinding, milling) in order to obtain a product with desired physical properties (e.g., particle size, surface area, etc.). In some embodiments, pozzolanic material is combined with a hydraulic cement (e.g., as a supplementary cementitious material, sand, aggregate, etc.). In some embodiments, one or more components are added to pozzolanic material (e.g., where the pozzolanic material is to be employed as a cement) to produce a final product (e.g., concrete or mortar), wherein the components include, but are not limited to, sands, aggregates, and supplementary cementitious materials.

In some embodiments, pozzolanic material produced by the methods disclosed herein is employed as a construction material. To be employed as a construction material, pozzolanic material may be processed for use as a construction material or processed for used in an existing construction material for buildings (e.g., commercial, residential) and/or infrastructure (e.g., roads, bridges, levees, dams, etc.). The construction material may be a constituent of a structural or nonstructural component of such buildings and infrastructure. An additional benefit of using pozzolanic material as a construction material or in a construction material is that $CO_2$ employed in the process (e.g., $CO_2$ obtained from a gaseous waste stream) is effectively sequestered in the built environment. In some embodiments, a precipitation system of the invention may be co-located with a building products factory such that the co-location facilitates processing of pozzolanic material into construction material.

In some embodiments, pozzolanic material is utilized to produce aggregates. Such aggregates, methods for their manufacture, and use of the aggregate are described in co-pending U.S. patent application Ser. No. 12/475,378, filed 29 May 2008, the disclosure of which is incorporated herein by reference in its entirety.

Figure 3:
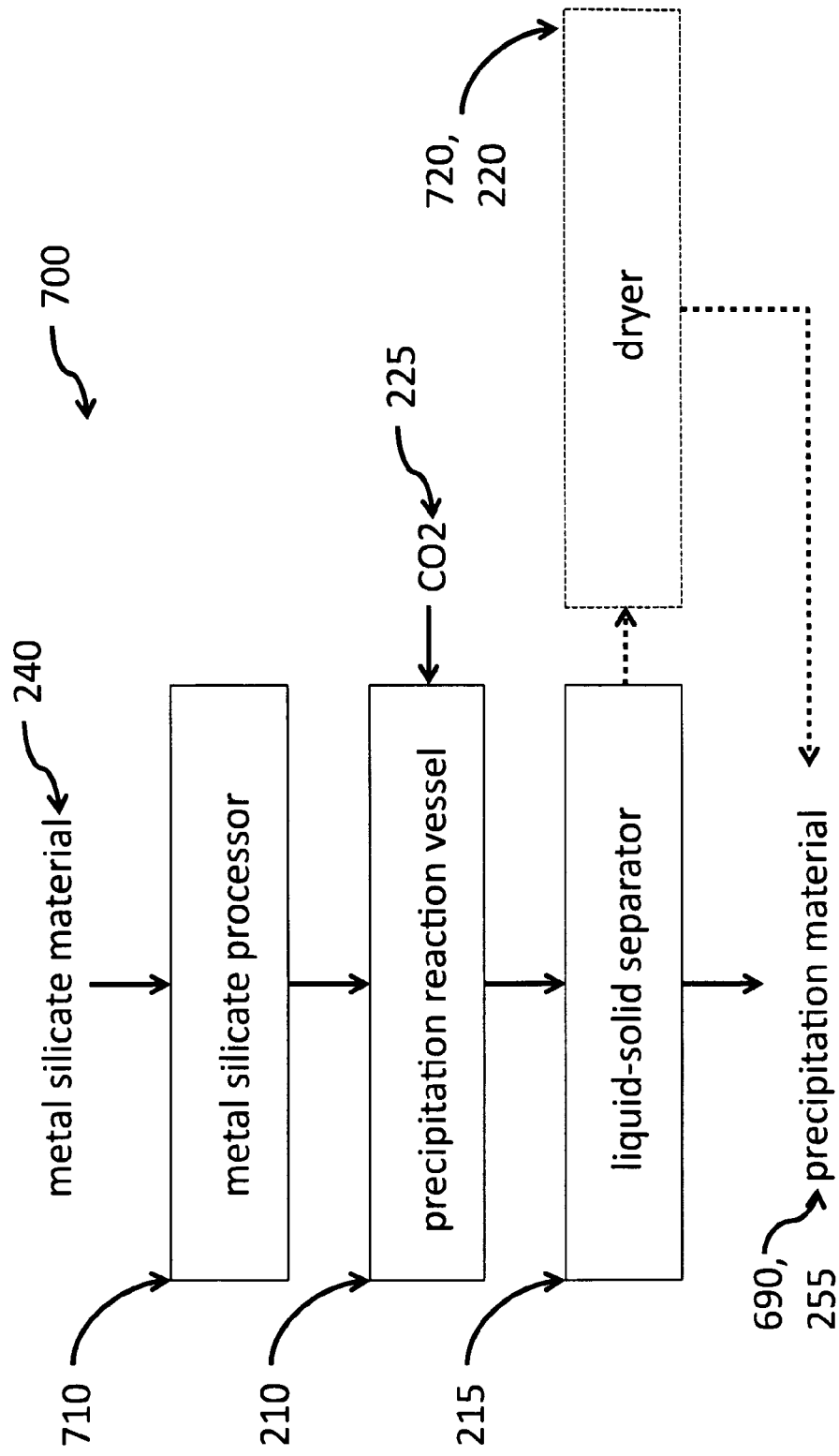
FIG. 3 illustrates a system configured to produce precipitation material from material comprising metal silicates.

FIG. 3 illustrates an exemplary system (700) for performing various methods as disclosed above. Metal silicate processor 710, which receives unprocessed material comprising metal silicates (240), comprises a size-reduction unit for reducing the size of material comprising metal silicates and a digester for digesting comminuted material comprising metal silicates. The size reduction unit may comprise any of a number of different apparatus for crushing, grinding (e.g., ball mill, jet mill, etc.), and selecting comminuted material comprising metal silicates (e.g., by sieve, by cyclone, etc.) for subsequent digestion. The digester is configured to receive comminuted material comprising metal silicates along with any other materials which may be useful for digestion of material comprising metal silicates, the other materials including, but not limited to water and pH-modifying agents (e.g., an acid, a proton-removing agent, etc.). The processor may further comprise a filter, wherein the filter is configured to remove silica and/or silicon-based material from digested material comprising metal silicates. The precipitation reaction vessel (210), which is operably connected to the metal silicate processor (710), is configured to accept digested material comprising metal silicates, or a slurry or aqueous solution thereof. In addition, the precipitation reaction vessel (210) is configured to receive $CO_2$ (e.g., hot or cooled $CO_2$ from an industrial waste source comprising $CO_2$) and any other reagents (e.g., acids, proton-removing agents, promoters), which may be useful in producing precipitation material or pozzolanic material of the invention. The precipitation reaction vessel may be further configured for adjusting and controlling precipitation reaction conditions. For example, the precipitation reaction vessel may have a temperature probe and heating element, both of which may be used to control the temperature of the precipitation reaction mixture. Liquid-solid separator (215), as shown in FIG. 3, is operably connected to the precipitation reaction vessel (210) and is configured to receive precipitation reaction mixture from the precipitation reaction vessel. The liquid-solid separator is further configured to separate the precipitation reaction mixture into two streams, which streams comprise supernatant and precipitation material. The resultant precipitation material may be a relatively moist solid or a slurry more rich in precipitation material than the original precipitation reaction mixture, either of which may optionally be provided to a dryer (720) configured to receive concentrated precipitation material. The dryer (e.g., spray dryer 220), which may accept waste heat from the industrial waste source of $CO_2$, produced dried precipitation or pozzolanic material.

Figure 4:
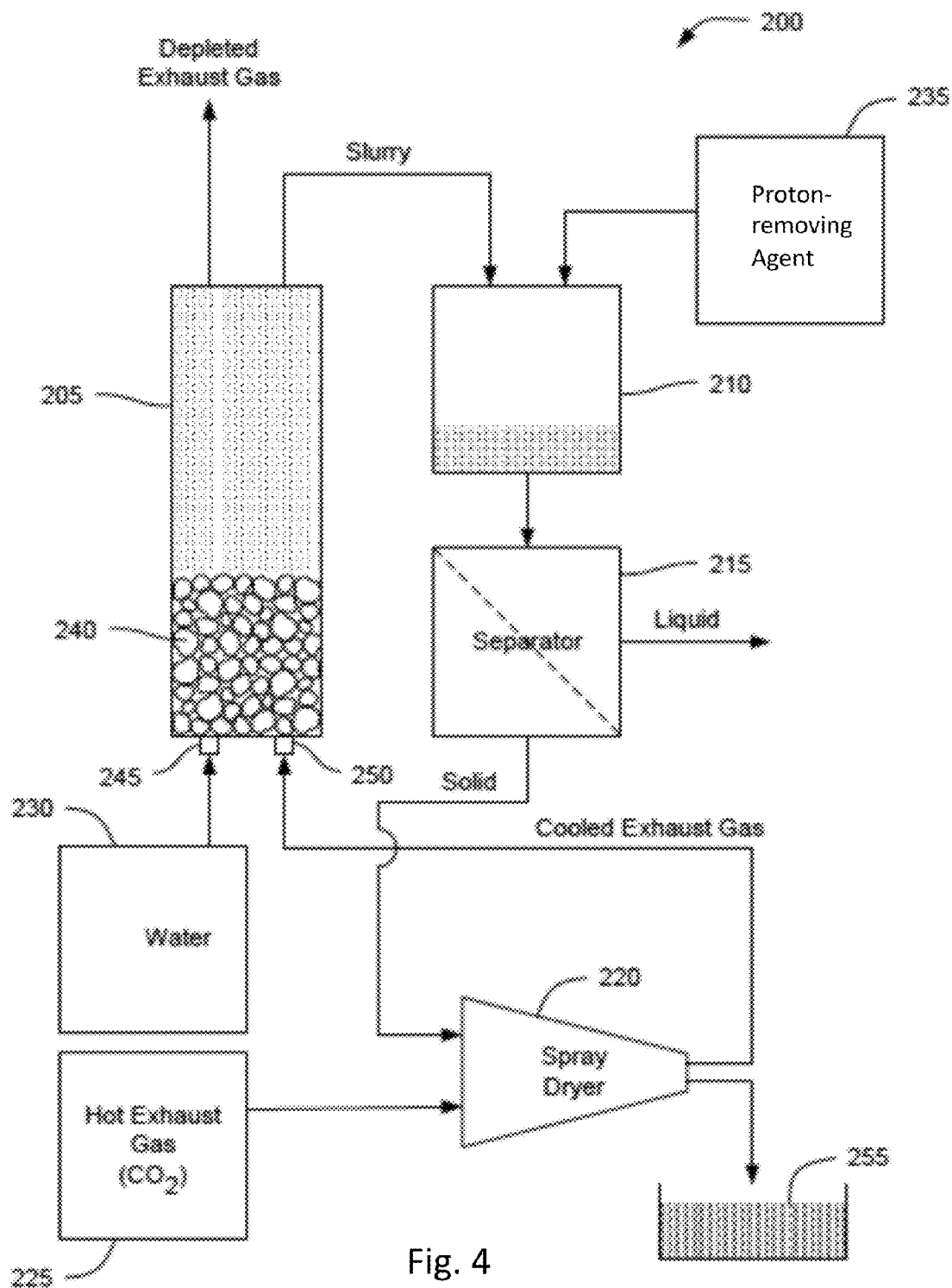
FIG. 4 shows a schematic representation of an exemplary system for producing a pozzolanic material, according to an embodiment of the invention.

FIG. 4 also illustrates an exemplary system (200) for performing various methods disclosed above. System 200 comprises a vertical column (205), a reaction vessel (210), a liquid-solid separator (215), and a spray dryer (220). The system (200) also comprises an exhaust gas source (225), a source of divalent cation-containing solution (230), and a source of proton-removing agent (235).

Vertical column 205, as shown, may be packed with a material comprising metal silicates (240). In some embodiments, the material comprising metal silicates (240) has a particle size of about 500 μm or less. In some embodiments, the material comprising metal silicates (240) occupies approximately the bottom ¼ of the vertical column (205). The vertical column (205) includes, in the bottom thereof, a liquid inlet (245) for receiving divalent cation-containing solution and a gas inlet (250) for receiving exhaust gas either directly from the source of exhaust gas (225), or from the spray dryer (220) as shown. Although not shown in FIG. 4, it will be appreciated that vertical column 205 and inlets 245 and 250 may include devices such as valves, flow meters, temperature probes, and pH probes as necessary to monitor and control the operation of the vertical column (205). Likewise, vertical column 205 is optionally adapted for mechanical agitation in some embodiments.

The bottom of the vertical column may be configured (as shown) such that divalent cation-containing solution and exhaust gas comprising $CO_2$ enter and mix (forming carbonic acid and lowering pH) in the bottom of vertical column 205. In some embodiments, the vertical column (205) further includes a mixing unit (not shown) that initially receives divalent cation-containing solution and $CO_2$-containing exhaust gas, wherein the mixing unit serves to acidify the divalent cation-containing solution before the divalent cation-containing solution encounters material comprising metal silicates 240. The mixing unit may be integral with the bottom of the vertical column (205) or it may be separate therefrom. Despite the particular configuration (i.e., integral or separate), the mixing unit is operably attached to the vertical column such that acidified divalent cation-containing solution is able to percolate through material comprising metal silicates 240 and digest a portion of the material comprising metal silicates (240) to form a silicon-based material slurry (optionally comprising smaller and/or unreacted material comprising metal silicates). Vertical column 205 is adapted to allow the silicon-based material slurry to move up through the vertical column 205 in the same flow direction of the original divalent cation-containing aqueous solution. The vertical column 205 is further adapted to allow exhaust gas to vent and slurry to exit the top of the column.

The exhaust gas that is vented from vertical column 205 is depleted of at least some of the $CO_2$ gas that was initially present in the exhaust gas as received from the source of exhaust gas (225). The $CO_2$-depleted exhaust gas may be vented directly into the atmosphere, further processed to remove other remaining constituents, or recovered to be used in another part of the process. In some embodiments, the exhaust gas that is vented from vertical column 205 is depleted with respect to $CO_2$ concentration as well as concentrations of one or more of heavy metals, heavy metal compounds, particulate matter, sulfur compounds (e.g., SOx), nitrogen compounds (e.g., NOx), and the like.

After a sufficient amount of the material comprising metal silicates (240) has been digested, the remaining material comprising metal silicates (240) in vertical column 205 is replaced with fresh material comprising metal silicates 240. In addition to providing a fresh charge of material comprising metal silicates 240 to be digested, replacing the material comprising metal silicates (240) also allows insoluble contaminants to be removed the vertical column (205). In some embodiments, the insoluble material that is not removed may become incorporated into the resultant precipitation material, and ultimately in pozzolanic material or cement as a filler. Further, as the material comprising metal silicates 240 is digested and the particle size is diminished, the rising divalent cation-containing solution tends to lift particles out of the packed bed portion of the vertical column (205). Thus, replacing the material comprising metal silicates (240) before the point of complete digestion addresses this issue as well. To allow for continuous operation of the system (200), a number of vertical columns (205) may be employed in parallel where the divalent cation-containing solution and exhaust gas streams are switched from one vertical column (205) to another as some vertical columns (205) are taken out of service for replenishment and other vertical columns (205) are brought back online.

As illustrated in FIG. 4, the slurry produced in the vertical column (205) is next transferred to reaction vessel 210. The slurry may be transferred by pipeline, for example. Proton-removing agent from source of proton-removing agent 235 is added to the slurry in the reaction vessel (210) to raise the pH of the slurry to produce precipitation material comprising carbonates (e.g., calcium carbonate, magnesium carbonate). Precipitation material will tend to settle with the silicon-based material on the bottom of the reaction vessel (210) in some embodiments. In some embodiments, where the proton-removing agent is in solution, the solution of proton-removing agent may be pumped into the reaction vessel (210). Proton-removing agents in solid form may be added by a conveyor belt, for instance. Although not shown in FIG. 4, it will be appreciated that the reaction vessel (210) may include devices such as valves, flow meters, agitators, mixers, temperature probes, and pH probes as necessary to monitor and control the operation of the reaction vessel (210). Also not shown in FIG. 4 is an optional source of an acid which may be a gas (e.g., carbon dioxide, HCl) or an acid in solution (e.g., $H_2CO_3$ (aq), HCl(aq)), for instance. The acid may be employed to balance pH within the reaction vessel (210).

In some embodiments, after precipitation material comprising silicon-based material and carbonates is withdrawn from the reaction vessel (210), the precipitation material is separated from the precipitation reaction mixture with a liquid-solid separator (215). An exemplary liquid-solid separator (215) includes a hydrocyclone. The liquid (i.e., supernatant) that is removed by the liquid-solid separator (215) may be disposed of, or used for other industrial processes, including as an input for reverse osmosis water purification.

As illustrated in FIG. 4, spray dryer 220 receives hot exhaust gas from the source of flue gas (225) and precipitation material comprising silicon-based material and carbonates (e.g., calcium carbonate, magnesium carbonate) from the liquid-solid separator (215) may be dried in spray dryer 220, optimizing energy efficiency. Precipitation material dried in spray dryer 220 with waste heat from the source of flue gas forms a fine powder with a controlled particle size, aspect ratio, density, and surface area, which powder may be used as pozzolanic powder 255. As heat of the exhaust gas contributes to drying the precipitation material in spray dryer 220, the exhaust gas is thereby also cooled. Advantageously, using the waste heat of the exhaust gas may reduce or even obviate the need to heat air or some other gas before spray drying. In order to be able to direct the cooled exhaust gas to the vertical column (205), spray dryer 220 may be disposed within a sealed chamber (not shown) so that the exhaust gas exiting the spray dryer (220) is contained.

The source of the exhaust gas (225) may be, in some embodiments, a fossil fuel-fired power plant, a refinery, or some other industrial process that emits an exhaust gas with an elevated concentration of $CO_2$ relative to the atmospheric level of $CO_2$, for example, as described in U.S. Provisional Patent Application No. 61/057,173, filed 29 May 2008, the disclosure of which is incorporated herein by reference in its entirety. In some embodiments, such exhaust gas is produced by a combustion reaction and therefore the exhaust gas carries residual heat from the combustion reaction. If the distance from the source of the exhaust gas (225) is extensive, or if the exhaust gas is otherwise not sufficiently hot for the purpose of spray drying, a gas heating unit (not shown) may be placed between the source of the exhaust gas (225) and the spray dryer (220) to boost the temperature of the exhaust gas. It will be appreciated that, in addition to oxidizing exhaust gases produced by combustion, the source of the exhaust gas (225) may be replaced with a source of a reducing gas such as syngas, shifted syngas, natural gas, hydrogen, or the like, so long as the reducing gas includes $CO_2$. Other suitable multi-component gaseous streams include turbo charged boiler product gas, coal gasification product gas, shifted coal gasification product gas, anaerobic digester product gas, wellhead natural gas streams, reformed natural gas or methane hydrates, and the like.

The source of the divalent cation-containing solution (230) may be, in some embodiments, a holding tank that may be filled with seawater, a brine, or some other divalent cation-containing solution as mentioned above. The holding tank may allow contaminants such as silt, sand, small rocks, and other particulate matter to settle out of the divalent cation-containing solution before the divalent cation-containing solution is introduced into the vertical column (205). Filters may also be employed.

FIG. 3 shows an optional source of a promoter (310) which may be employed to add a carbonate promoter to the reaction vessel (210). As discussed above, exemplary carbonate promoters include, but are not limited to, small concentrations of transition metals such as iron, cobalt, nickel, manganese, zinc, chromium, copper, barium, gold, platinum, or silver. The source of the promoter (310) may include a regulator (not shown) for the controlled release of the carbonate promoter into the reaction vessel (210). A feedback system (not shown) may be used to monitor concentration of the carbonate promoter in the reaction vessel (210) and adjust the regulator accordingly.

Figure 6:
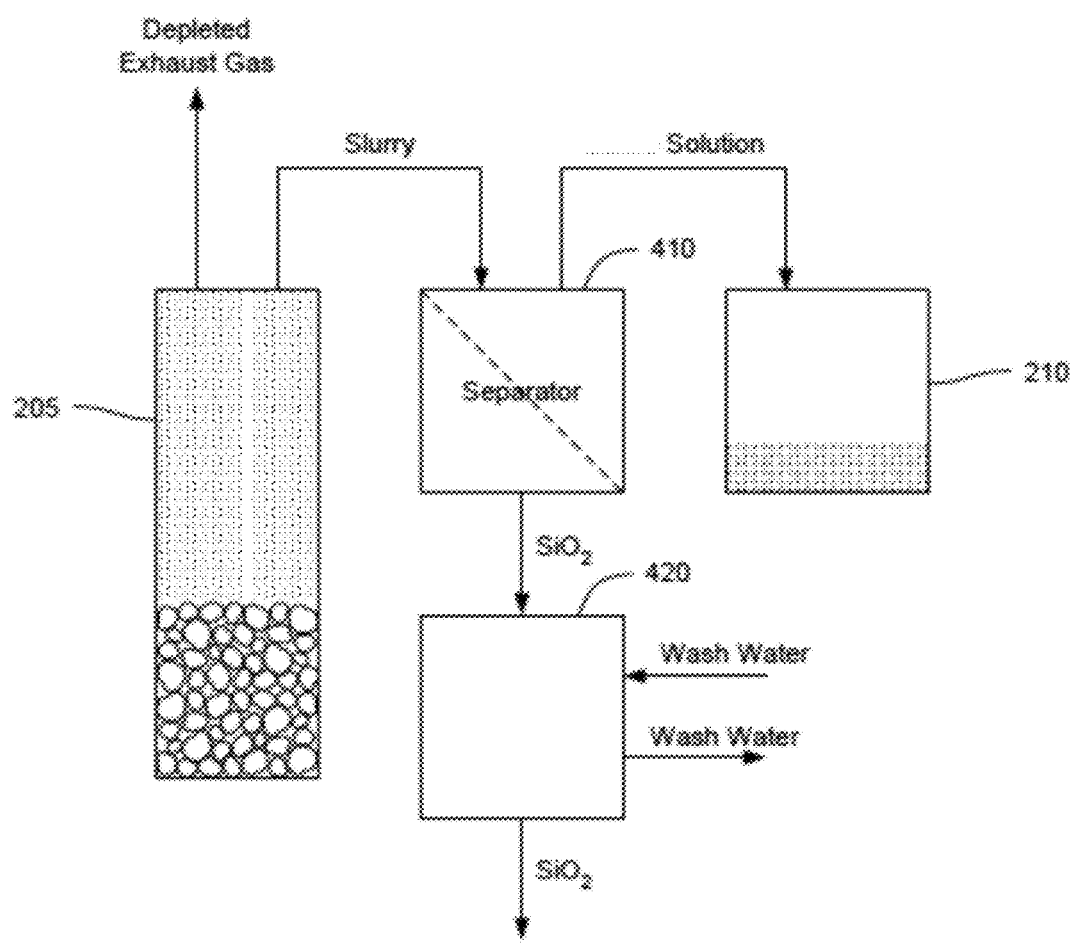
FIG. 6 shows a schematic representation of an optional addition to the system represented in FIG. 2, according to an embodiment of the invention.

FIG. 6 shows an optional liquid-solid separator (410) disposed between the vertical column (205) and the reaction vessel (210). The liquid-solid separator (410) receives slurry from the vertical column, separates the silicon-based material (e.g., silica, unreacted or undigested silicate, etc.) from the divalent cation-containing solution, and directs the divalent cation-containing solution to the reaction vessel (210). The silicon-based material that is removed from the liquid-solid separator (410) is sometimes referred to as wet cake. Also shown in FIG. 6 is washer 420 for washing silicon-based material, which washer receives wash water and silicon-based material from the liquid-solid separator (410). The washer (420) removes soluble salts to produce a washed silicon-based material and spent wash water. The silicon-based material removed from the washer (420) may then be dried to produce a fine silicon-based powder. In some embodiments, the liquid-solid separator (410) and the washer (420) are combined into a single unit. It will be appreciated that a washer (420) may also be included in the system (200) to receive and wash precipitation material comprising carbonates and silicon-based material from the liquid-solid separator (215) before the spray dryer (220).

Figure 7:
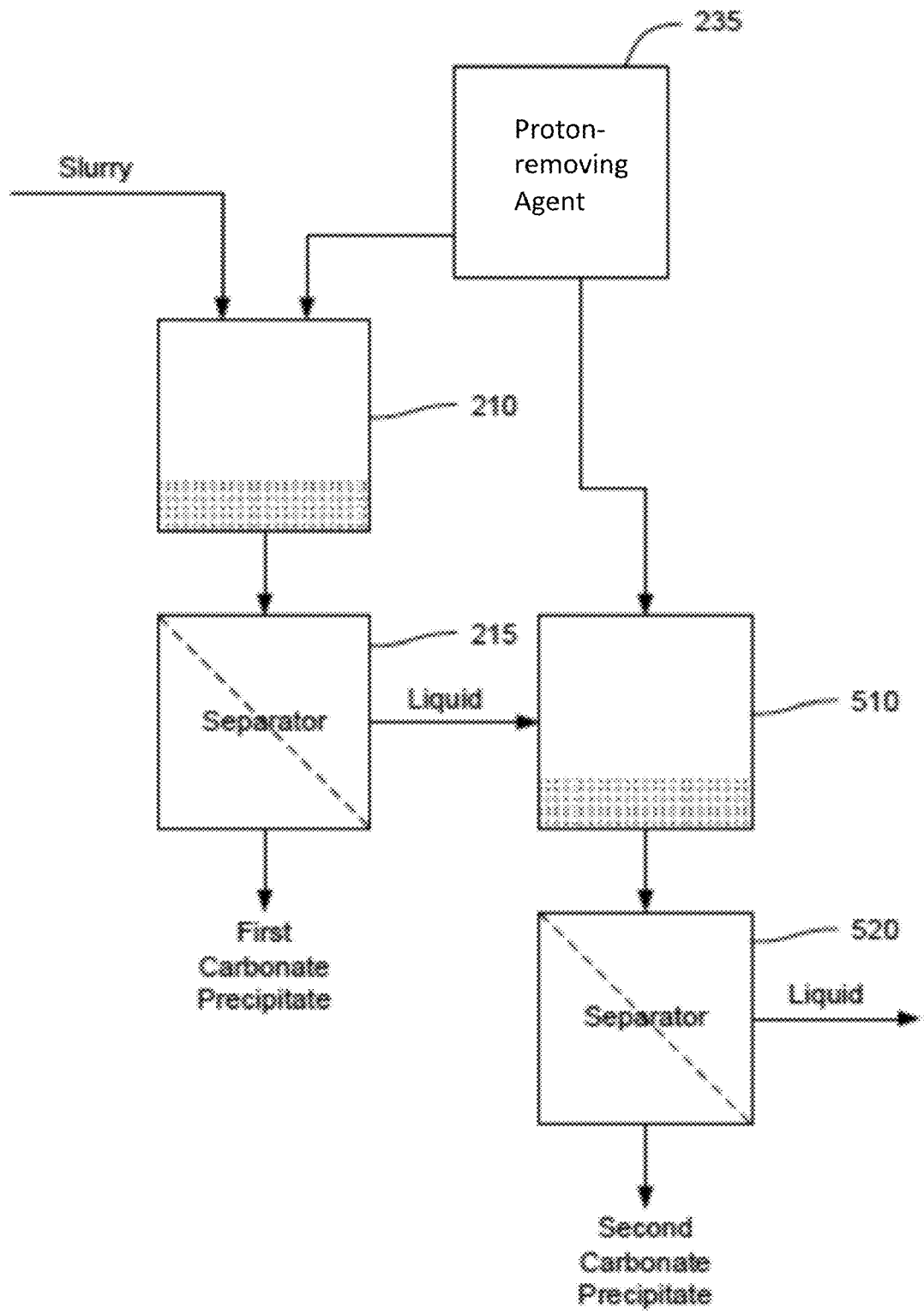
FIG. 7 shows a schematic representation of an optional addition to the system represented in FIG. 2, according to an embodiment of the invention.

FIG. 7 illustrates system 200 in which a second reaction vessel (510) receives supernatant from the liquid-solid separator (215) and additional proton-removing agent from the source of proton-removing agent (235). In this embodiment, the conditions in the reaction vessel (210) are controlled to produce a first carbonate-containing precipitation material, which material is separated from the precipitation reaction mixture in the liquid-solid separator (215). Supernatant from the liquid-solid separator (215) is made more basic, for example, by addition of further proton-removing agent from the source of proton-removing agent (235) to cause a second carbonate-containing precipitation material to form. The second precipitation material is then separated from the precipitation reaction mixture in a second liquid-solid separator (520). The first and second carbonate-containing precipitation materials may be separately washed, as in FIG. 6, and then separately spray dried to create two fine powders. These powders may then be mixed with a powder of silicon-based material (FIG. 6) to produce a pozzolanic material. In some embodiments, the first carbonate-containing precipitation material comprises calcium carbonate and the second carbonate-containing precipitation material comprises magnesium carbonate, while, in other embodiments, the first carbonate-containing precipitation material comprises magnesium carbonate and the second carbonate-containing material comprises calcium carbonate.

Figure 5:
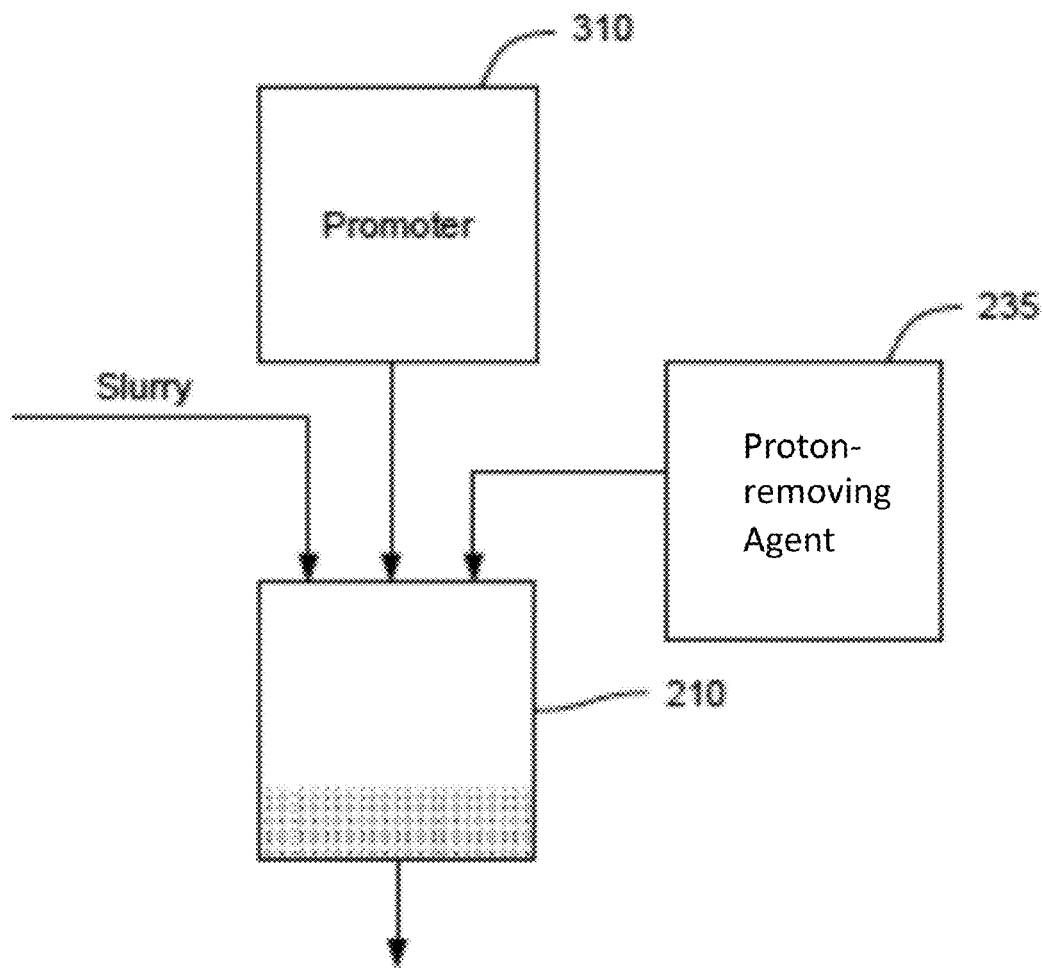
FIG. 5 shows a schematic representation of an optional addition to the system represented in FIG. 2, according to an embodiment of the invention.

It will be appreciated that a carbonate promoter may be added to either or both of the reaction vessels (210, 510) illustrated in FIG. 5. Where a carbonate promoter is added to both of the reaction vessels (210, 510), different carbonate promoters may be used, or different concentrations of the same carbonate promoter may be used. Further, although FIG. 7 shows the second reaction vessel (510) as receiving proton-removing agent from the same source of proton removing agent (235) as serves reaction vessel 210, in some embodiments, the second reaction vessel (510) receives a different proton-removing agent from a second source of proton-removing agent. Further still, in some embodiments, the supernatant received in the second reaction vessel (510) is made more acidic, rather than more basic, to produce the second carbonate-containing precipitation material. As above, acidification may be achieved by contact with a gas stream comprising $CO_2$, or by the addition of an acidic solution or a soluble solid acid. Moreover, in addition to, or in an alternative to, maintaining different pH levels and using different carbonate promoters in the reaction vessels (210, 510), other conditions such as temperature, pressure, the presence of certain seed crystals, and so forth, may be varied to cause different carbonate-containing precipitation materials to form in the two reaction vessels (210, 510).

Compositions and End Products

Precipitation material of the invention may comprise several carbonates and/or several carbonate mineral phases resulting from co-precipitation, wherein the precipitation material may comprise, for example, calcium carbonate (e.g., calcite) together with magnesium carbonate (e.g., nesquehonite). Precipitation material may also comprise a single carbonate in a single mineral phase including, but not limited to, calcium carbonate (e.g., calcite), magnesium carbonate (e.g., nesquehonite), calcium magnesium carbonate (e.g., dolomite), or a ferro-carbo-aluminosilicate. As different carbonates may be precipitated in sequence, the precipitation material may be, depending upon the conditions under which it was obtained, relatively rich (e.g., 90% to 95%) or substantially rich (e.g., 95%-99.9%) in one carbonate and/or one mineral phase, or the precipitation material may comprise an amount of other carbonates and/or other mineral phase (or phases), wherein the desired mineral phase is 50-90% of the precipitation material. It will be appreciated that, in some embodiments, the precipitation material may comprise one or more hydroxides (e.g., $Ca(OH)_2$, $Mg(OH)_2$) in addition to the carbonates. It will also be appreciated that any of the carbonates or hydroxides present in the precipitation material may be wholly or partially amorphous. In some embodiments, the carbonates and/or hydroxides are wholly amorphous.

While many different carbon-containing salts and compounds are possible due to variability of starting materials, precipitation material comprising magnesium carbonate, calcium carbonate, or combinations thereof is particularly useful. In some embodiments, the precipitation material comprises dolomite ($CaMg(CO_3)_2$), protodolomite, huntite ($CaMg_3(CO_3)_4$), and/or sergeevite ($Ca_2Mg_{11}(CO_3)_{13} \cdot H_2O$), which are carbonate minerals comprising both calcium and magnesium. In some embodiments, the precipitation material comprises calcium carbonate in one or more phases selected from calcite, aragonite, vaterite, or a combination thereof. In some embodiments, the precipitation material comprises hydrated forms of calcium carbonate selected from ikaite ($CaCO_3 \cdot 6H_2O$), amorphous calcium carbonate ($CaCO_3 \cdot nH_2O$), monohydrocalcite ($CaCO_3 \cdot H_2O$), or combinations thereof. In some embodiments, the precipitation material comprises magnesium carbonate, wherein the magnesium carbonate does not have a water of hydration. In some embodiments, the precipitation material comprises magnesium carbonate, wherein the magnesium carbonate may have any of a number of different waters of hydration selected from 1, 2, 3, 4, or more than 4 waters of hydration. In some embodiments, the precipitation material comprises 1, 2, 3, 4, or more than 4 different magnesium carbonate phases, wherein the magnesium carbonate phases differ in the number of waters of hydration. For example, precipitation material may comprise magnesite ($MgCO_3$), barringtonite ($MgCO_3 \cdot 2H_2O$), nesquehonite ($MgCO_3 \cdot 3H_2O$), lansfordite ($MgCO_3 \cdot 5H_2O$), and amorphous magnesium carbonate. In some embodiments, precipitation material comprises magnesium carbonates that include hydroxide and waters of hydration such as artinite ($MgCO_3 \cdot Mg(OH)_2 \cdot 3H_2O$), hydromagnesite ($Mg_5(CO_3)_4(OH)_2 \cdot 3H_2O$), or combinations thereof. As such, precipitation material may comprise carbonates of calcium, magnesium, or combinations thereof in all or some of the various states of hydration listed herein. Precipitation rate may also influence the nature of the precipitation material with the most rapid precipitation rate achieved by seeding the solution with a desired phase. Without seeding, rapid precipitation may be achieved by, for example, rapidly increasing the pH of the precipitation reaction mixture, which results in more amorphous constituents. Furthermore, the higher the pH, the more rapid the precipitation, which precipitation results in a more amorphous precipitation material.

Adjusting major ion ratios during precipitation may influence the nature of the precipitation material. Major ion ratios have considerable influence on polymorph formation. For example, as the magnesium:calcium ratio in the water increases, aragonite becomes the major polymorph of calcium carbonate in the precipitation material over low-magnesium calcite. At low magnesium:calcium ratios, low-magnesium calcite becomes the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the precipitation material is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the precipitation material is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the precipitation material is between 1:1 and 1:10; 1:5 and 1:25; 1:10 and 1:50; 1:25 and 1:100; 1:50 and 1:500; or 1:100 and 1:1000.

Precipitation material, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C \text{ ‰} = [(^{13}C/^{12}C_{sample} - ^{13}C/^{12}C_{PDB\ standard})/(^{13}C/^{12}C_{PDB\ standard})] \times 1000$$

As such, the $\delta^{13}C$ value of the synthetic carbonate-containing precipitation material serves as a fingerprint for a $CO_2$ gas source. The $\delta^{13}C$ value may vary from source to source (i.e., fossil fuel source), but the $\delta^{13}C$ value for composition of the invention generally, but not necessarily, ranges between −9‰ to −35‰. In some embodiments, the $\delta^{13}C$ value for the synthetic carbonate-containing precipitation material is between 1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}C$ value for the synthetic carbonate-containing precipitation material is less than (i.e., more negative than) −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰, wherein the more negative the $\delta^{13}C$ value, the more rich the synthetic carbonate-containing composition is in $^{12}C$. Any suitable method may be used for measuring the $\delta^{13}C$ value, methods including, but no limited to, mass spectrometry or off-axis integrated-cavity output spectroscopy (off-axis ICOS).

In addition to magnesium- and calcium-containing products of the precipitation reaction, compounds and materials comprising silicon, aluminum, iron, and others may also be prepared and incorporated within precipitation material with methods and systems of the invention. Precipitation of such compounds in precipitation material may be desired to alter the reactivity of cements comprising the precipitated material resulting from the process, or to change the properties of cured cements and concretes made from them. Material comprising metal silicates is added to the precipitation reaction mixture as one source of these components, to produce carbonate-containing precipitation material which contains one or more components, such as amorphous silica, amorphous aluminosilicates, crystalline silica, calcium silicates, calcium alumina silicates, etc. In some embodiments, the precipitation material comprises carbonates (e.g., calcium carbonate, magnesium carbonate) and silica in a carbonate:silica ratio between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:7.5; 1:7.5 and 1:10; 1:10 and 1:15; 1:15 and 1:20, or a range thereof. For example, in some embodiments, the precipitation material comprises carbonates and silica in a carbonate:silica ratio between 1:1 and 1:5, 1:5 and 1:10, or 1:5 and 1:20. In some embodiments, the precipitation material comprises silica and carbonates (e.g., calcium carbonate, magnesium carbonate) in a silica:carbonate ratio between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:7.5; 1:7.5 and 1:10; 1:10 and 1:15; 1:15 and 1:20, or a range thereof. For example, in some embodiments, the precipitation material comprises silica and carbonates in a silica:carbonate ratio between 1:1 and 1:5, 1:5 and 1:10, or 1:5 and 1:20. In general, precipitation material produced by methods of the invention comprises mixtures of silicon-based material and at least one carbonate phase. In general, the more rapid the reaction rate, the more silica is incorporated with the carbonate-containing precipitation material, provided silica is present in the precipitation reaction mixture (i.e., provided silica was not removed after digestion of material comprising metal silicates).

Precipitation material may be in a storage-stable form (which may simply be dried precipitation material), and may be stored above ground under exposed conditions (i.e., open to the atmosphere) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage-stable form of the precipitation material undergoes little if any degradation while stored above ground under normal rain water pH, the amount of degradation if any as measured in terms of $CO_2$ gas release from the product will not exceed 5% per year, and in certain embodiments will not exceed 1% per year. The above-ground storage-stable forms of the precipitation material are stable under a variety of different environment conditions, e.g., from temperatures ranging from −100° C. to 600° C. and humidity ranging from 0 to 100% where the conditions may be calm, windy or stormy. Any of a number of suitable methods may be used to test the stability of the precipitation material including physical test methods and chemical test methods, wherein the methods are suitable for determining that the compounds in the precipitation material are similar to or the same as naturally occurring compounds known to have the above specified stability (e.g., limestone).

The carbonate-containing precipitation material, which serves to sequester $CO_2$ in a form that is stable over extended periods of time (e.g., geologic time scales), may be stored for extended durations, as described above. The precipitation material, if needed to achieve a certain ratio of carbonates to silica, may also be mixed with silicon-based material (e.g., from separated silicon-based material after material comprising metal silicates digestion; commercially available $SiO_2$; etc.) to form pozzolanic material. Pozzolanic materials of the invention are siliceous or aluminosiliceous materials which, when combined with an alkali such as calcium hydroxide $(Ca(OH)_2)$, exhibit cementitious properties by forming calcium silicates and other cementitious materials. $SiO_2$-containing materials such as volcanic ash, fly ash, silica fume, high reactivity metakaolin, and ground granulated blast furnace slag, and the like may be used to fortify pozzolanic materials of the invention. In some embodiments, pozzolanic materials of the invention are fortified with 0.5% to 1.0%, 1.0% to 2.0%; 2.0% to 4.0%, 4.0% to 6.0%, 6.0% to 8.0%, 8.0% to 10.0%, 10.0% to 15.0%, 15.0% to 20.0%, 20.0% to 30.0%, 30.0% to 40.0%, 40.0% to 50.0%, or an overlapping range thereof, an $SiO_2$-containing material.

Spray-dried material (e.g., precipitation material, silicon-based material, pozzolanic material, etc.), by virtue of being spray dried, may have a consistent particle size (i.e., the spray-dried material may have a relatively narrow particle size distribution). As such, in some embodiments, at least 50%, 60%, 70%, 80%, 90%, 95%, 97%, or 99% of the spray-dried material falls within ±10 microns, ±20 microns, ±30 microns, ±40 microns, ±50 microns, ±75 microns, ±100 microns, or ±250 microns of a given mean particle diameter. In some embodiments, the given mean particle diameter is between 5 and 500 microns. In some embodiments, the given mean particle is between 50 and 250 microns. In some embodiments, the given mean particle diameter is between 100 and 200 microns. For example, in some embodiments, at least 70% of the spray-dried material falls within ±50 microns of a given mean particle diameter, wherein the given mean particle diameter is between 5 and 500 microns, such as between 50 and 250 microns, or between 100 and 200 microns.

Generally, pozzolanic material has lower cementitious properties than ordinary Portland cement, but in the presence of a lime-rich media like calcium hydroxide, it shows better cementitious properties towards later day strength (>28 days). The pozzolanic reaction may be slower than the rest of the reactions which occur during cement hydration, and thus the short-term strength of concretes that include pozzolanic material of the invention may not be as high as concrete made with purely cementitious materials. The mechanism for this display of strength is the reaction of silicates with lime to form secondary cementitious phases (calcium silicate hydrates with a lower C/S ratio), which display gradual strengthening properties usually after 7 days. The extent of the strength development ultimately depends upon the chemical composition of the pozzolanic material. Increasing the composition of silicon-based material (optionally with added silica and/or alumina), especially amorphous silicon-based material, generally produces better pozzolanic reactions and strengths. Highly reactive pozzolans, such as silica fume and high reactivity metakaolin may produce "high early strength" concrete that increases the rate at which concrete comprising precipitation material of the invention gains strength.

Precipitation material comprising silicates and aluminosilicates may be readily employed in the cement and concrete industry as pozzolanic material by virtue of the presence of the finely divided siliceous and/or alumino-siliceous material (e.g., silicon-based material). The siliceous and/or aluminosiliceous precipitation material may be blended with Portland cement, or added as a direct mineral admixture in a concrete mixture. In some embodiments, pozzolanic material comprises calcium and magnesium in a ratio (as above) that perfects setting time, stiffening, and long-term stability of resultant hydration products (e.g., concrete). Crystallinity of carbonates, concentration of chlorides, sulfates, alkalis, etc. in the precipitation material may be controlled to better interact with Portland cement. In some embodiments, precipitation material comprises silica in which 10-20%, 20-30%, 30-40%, 40-50%, 50-60%, 60-70%, 70-80%, 80-90%, 90-95%, 95-98%, 98-99%, 99-99.9% of the silica has a particle size less than 45 microns (e.g., in the longest dimension). In some embodiments, siliceous precipitation material comprises aluminosilica in which 10-20%, 20-30%, 30-40%, 40-50%, 50-60%, 60-70%, 70-80%, 80-90%, 90-95%, 95-98%, 98-99%, 99-99.9% of the aluminosilica has a particle size less than 45 microns. In some embodiments, siliceous precipitation material comprises a mixture of silica and aluminosilica in which 10-20%, 20-30%, 30-40%, 40-50%, 50-60%, 60-70%, 70-80%, 80-90%, 90-95%, 95-98%, 98-99%, 99-99.9% of the mixture has a particle size less than 45 microns (e.g., in the biggest dimension).

Pozzolanic material produced by the methods disclosed herein may be employed as a construction material, which material may be processed for use as a construction material or processed for use in an existing construction material for buildings (e.g., commercial, residential, etc.) and/or infrastructure (e.g., pavements, roads, bridges, overpasses, walls, levees, dams, etc.). The construction material may be incorporated into any structure, the structures further including foundations, parking structures, houses, office buildings, commercial offices, governmental buildings, and support structures (e.g., footings for gates, fences and poles) is considered a part of the built environment. The construction material may be a constituent of a structural or nonstructural component of such structure. An additional benefit of using pozzolanic material as a construction material or in a construction material is that $CO_2$ employed in the process (e.g., $CO_2$ obtained from a gaseous waste stream) is effectively sequestered in the built environment.

In some embodiments, pozzolanic material of the invention is employed as a component of a hydraulic cement (e.g., ordinary Portland cement), which sets and hardens after combining with water. Setting and hardening of the product produced by combining the precipitation material with cement and water results from the production of hydrates that are formed from the cement upon reaction with water, wherein the hydrates are essentially insoluble in water. Such hydraulic cements, methods for their manufacture and use are described in co-pending U.S. patent application Ser. No. 12/126,776, filed on 23 May 2008, the disclosure of which application is incorporated herein by reference. In some embodiments, pozzolanic material blended with cement is between 0.5% and 1.0%, 1.0% and 2.0%, 2.0% and 4.0%, 4.0% and 6.0%, 6.0% and 8.0%, 8.0% and 10.0%, 10.0% and 15.0%, 15.0% and 20.0%, 20.0% and 30.0%, 30.0% and 40.0%, 40.0% and 50.0%, 50% and 60%, or a range thereof, pozzolanic material by weight. For example, in some embodiments, pozzolanic material blended with cement is between 0.5% and 2.0%, 1.0% and 4.0%, 2.0% and 8.0%, 4.0% and 15.0%, 8.0% and 30.0%, or 15.0% and 60.0% pozzolanic material by weight.

In some embodiments, pozzolanic material is blended with other cementitious materials or mixed into cements as an admixture or aggregate. Mortars of the invention find use in binding construction blocks (e.g., bricks) together and filling gaps between construction blocks. Mortars of the invention may also be used to fix existing structure (e.g., to replace sections where the original mortar has become compromised or eroded), among other uses.

In some embodiments, the pozzolanic material may be utilized to produce aggregates. In some embodiments, aggregate is produced from the precipitation material by pressing and subsequent crushing. In some embodiments, aggregate is produced from the precipitation material by extrusion and breaking resultant extruded material. Such aggregates, methods for their manufacture and use are described in co-pending U.S. patent application Ser. No. 12/475,378, filed on 29 May 2009, the disclosure of which is incorporated herein by reference in it entirety.

The following examples are put forth so as to provide those of ordinary skill in the art with a complete disclosure and description of how to make and use the invention, and are not intended to limit the scope of the invention. Efforts have been made to ensure accuracy with respect to numbers used (e.g. amounts, temperature, etc.), but some experimental errors and deviations should be accounted for. Unless indicated otherwise, parts are parts by weight, molecular weight is weight average molecular weight, temperature is in degrees Centigrade (° C.), and pressure is at or near atmospheric.

EXAMPLES

Example 1

Analytical Instrumentation and Methods

Coulometry: Liquid and solid carbon containing samples were acidified with 2.0 N perchloric acid ($HClO_4$) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). Samples of cement, fly ash, and seawater are heated after addition of perchloric acid with a heated block to aid digestion of the sample.

Brunauer-Emmett-Teller ("BET") Specific Surface Area: Specific surface area (SSA) measurement was by surface absorption with dinitrogen (BET method). SSA of dry samples was measured with a Micromeritics Tristar™ II 3020 Specific Surface Area and Porosity Analyzer after preparing the sample with a Flowprep™ 060 sample degas system. Briefly, sample preparation involved degassing approximately 1.0 g of dry sample at an elevated temperature while exposed to a stream of dinitrogen gas to remove residual water vapor and other adsorbents from the sample surfaces. The purge gas in the sample holder was subsequently evacuated and the sample cooled before being exposed to dinitrogen gas at a series of increasing pressures (related to adsorption film thickness). After the surface was blanketed, the dinitrogen was released from the surface of the particles by systematic reduction of the pressure in the sample holder. The desorbed gas was measured and translated to a total surface area measurement.

Particle Size Analysis ("PSA"): Particle size analysis and distribution were measured using static light scattering. Dry particles were suspended in isopropyl alcohol and analyzed using a Horiba Particle Size Distribution Analyzer (Model LA-950V2) in dual wavelength/laser configuration. Mie scattering theory was used to calculate the population of particles as a function of size fraction, from 0.1 mm to 1000 mm.

Powder X-ray Diffraction ("XRD"): Powder X-ray diffraction was undertaken with a Rigaku Miniflex™ (Rigaku) to identify crystalline phases and estimate mass fraction of different identifiable sample phases. Dry, solid samples were hand-ground to a fine powder and loaded on sample holders. The X-ray source was a copper anode (Cu kα), powered at 30 kV and 15 mA. The X-ray scan was run over 5-90° 2θ, at a scan rate of 2° 2θ per min, and a step size of 0.01° 2θ per step. The X-ray diffraction profile was analyzed by Rietveld refinement using the X-ray diffraction pattern analysis software Jade™ (version 9, Materials Data Inc. (MDI)).

Fourier Transform Infrared ("FT-IR") spectroscopy: FT-IR analyses were performed on a Nicolet 380 equipped with the Smart Diffuse Reflectance module. All samples were weighed to 3.5±0.5 mg and hand ground with 0.5 g KBr and subsequently pressed and leveled before being inserted into the FTIR for a 5-minute nitrogen purge. Spectra were recorded in the range 400-4000 cm-1.

Scanning Electron Microscopy ("SEM"): SEM was performed using an Hitachi TM-1000 tungsten filament tabletop microscope using a fixed acceleration voltage of 15 kV at a working pressure of 30-65 Pa, and a single BSE semiconductor detector. Solid samples were fixed to the stage using a carbon-based adhesive; wet samples were vacuum dried to a graphite stage prior to analysis. EDS analysis was performed using an Oxford Instruments SwiftED-TM system, the sensor for which has a detection range of $^{11}$Na-$^{92}$U with an energy resolution of 165 eV.

Soluble Chloride: Chloride concentrations were determined with Chloride QuanTab® Test Strips (Product No. 2751340), having a testing range between 300-6000 mg chloride per liter solution measured in 100-200 ppm increments.

X-ray Fluorescence ("XRF"): XRF analyses of solid powder samples were performed using a Thermo Scientific ARL QUANT'X Energy-Dispersive XRF spectrometer, equipped with a silver anode X-ray source and a Peltier cooled Si(Li) X-ray detector. The samples were pressed into 31 mm pellets using an aluminum sample cup. For each sample, three different spectra were gathered, each tailored for analysis of specific elements: the first using no X-ray filter at 4 kV, the second using a thin silver filter at 18 kV, and the third using a thick silver filter at 30 kV, all under vacuum conditions. Spectra were analyzed using WinTrace software, using a Fundamental Parameters analysis method attained from calibration with certified standard materials.

Thermogravimetric Analysis ("TGA"): TGA analyses of solid powder samples were performed with a TA Instruments SDT Q600 with simultaneous TGA/DSC (Differential Scanning Calorimetry). Samples, in an alumina crucible, were placed into a furnace that was heated from room temperature to 1000° C. at a constant ramp rate of 20° C. per minute. The weight loss profile over temperature was analyzed using Universal Analysis software.

Example 2

Digestion of Olivine

Summary: Olivine was Digested with Acid.

Material comprising metal silicates: Olivine, having a mean particle size of 54.3 μm was obtained from Olivine Corp (Bellingham, Wash.). A jet mill was used to reduce a fraction of olivine to a mean particle size of 5.82 μm.

Method: Digestion of olivine was achieved at room temperature (20-23° C.) by stirring olivine into 10% HCl (aq) (5.54 g of olivine (54.3 μm) into 419.37 g 10% HCl). Olivine was leached for four days before measuring concentration of aqueous magnesium by potentiometric EDTA titrations.

Results and Observations: Concentration of $Mg^{2+}$ was determined in the experiment by EDTA titration with a calcium ion selective electrode. The experiment for olivine yielded a $Mg^{2+}$ concentration of 0.1564 M after four days of leaching.

Example 3

Digestion of Serpentine

Summary: Serpentine was Digested with Acid.

Material comprising metal silicates: Serpentine was obtained from KC Mining (King City, Calif.).

Method: Digestion of serpentine was achieved at room temperature (20-23° C.) by serpentine into 10% HCl(aq) (5.03 g serpentine into 415.32 g 10% HCl). Serpentine was leached for four days before measuring concentration of aqueous magnesium by potentiometric EDTA titrations.

Results and Observations: Concentration of $Mg^{2+}$ was determined in the experiment by EDTA titration with a calcium ion selective electrode. The experiment for serpentine yielded a $Mg^{2+}$ concentration of 0.1123 M after four days of leaching.

Example 4

Preparation of Precipitation Material from Olivine

Summary: Carbonate-containing precipitation material was prepared using olivine as a raw material. Olivine was digested with acid. Precipitation of precipitation material involved injecting carbon dioxide and adding proton-removing agent to material comprising metal silicates leachate (e.g., olivine leachate). Characterization of precipitation material prepared from olivine leachate indicated a solid product that was predominantly nesquehonite (77%), along with an unidentified amorphous silicon-containing compound. Minor constituents were halite and an unidentified iron salt.

Material comprising metal silicates: Olivine, having a mean particle size of 54.3 μm was obtained from Olivine Corp (Bellingham, Wash.). A jet mill was used to reduce a fraction of olivine to a mean particle size of 5.82 μm.

Method: Olivine was digested at a temperature of 50° C. by stirring material comprising metal silicates into 10% HCl(aq) (10.01 g of jet milled olivine into 475.66 g 10% HCl). Samples were taken periodically to measure concentration of aqueous magnesium. Stirring was maintained for 10 hours, after which the mixture was allowed to sit at room temperature for an additional 9 hours. The mixture was vacuum filtered while hot, and the resultant filtrate (404.52 g) was allowed to cool to room temperature.

The filtrate was neutralized over a period of 1 hour, after which 100% $CO_2$ was heavily sparged throughout the magnesium-containing solution. With stirring, 15.01 g of NaOH (s) was added followed by an additional 5.23 g of NaOH (aq) (50% w/w), producing carbonate-containing precipitation material. The final pH of the precipitation reaction mixture was pH 8.9. The precipitation reaction mixture slurry was vacuum filtered, and the resultant filter cake was dried in an oven at 50° C. for 17 hours.

The dried precipitation material was characterized by XRD for identification of crystalline phases, SEM for observation of morphology, EDS and XRF for elemental analysis, and carbon coulometry for determination of percent weight inorganic carbon.

Results and Observations: Concentration of $Mg^{2+}$ was determined in the leaching experiments by EDTA titration with a calcium ion selective electrode. The leachate sample of olivine, which was jet milled and leached overnight at 50° C., had a $Mg^{2+}$ concentration of 0.2491 M.

The precipitation material yielded 19.26 g of a coarse, light-grey powder with a tint of yellow-green, which indicated the presence of an iron salt. The precipitation material was fairly easy to crush. SEM (FIG. 8) revealed a mixture primarily composed of thin crystalline rods and amorphous silica gel. EDS measurements indicated the presence of Mg, Si, Fe, Na, and Cl.

XRD (FIG. 9) indicated that the crystalline phases present in the precipitation material were nesquehonite ($MgCO_3.3H_2O$) and halite (NaCl). Amorphous content was also present, suggesting that there were phases in addition to nesquehonite and halite, which is consistent with the presence of other elements in the EDS analysis.

Carbon coulometry indicated that the product was 4.65% (±0.06) inorganic carbon, which is calculated to be 17.0% $CO_2$. Thermogravimetric analysis (TGA, FIG. 10) determined a 17.1% weight loss between 275° C. and 575° C., which was previously determined to be the range in which $CO_2$ is evolved from nesquehonite. Given the XRD identification, and that the TGA and coulometry results were in agreement with each other (<1% difference), it was calculated that the product was composed of 76.6% nesquehonite.

The precipitation material also contained a silicon-based material, which appeared to be amorphous silica ($SiO_2$), a thermal decomposition product of silicic acid ($H_4SiO_4$).

TABLE 1

XRF data for precipitation material.

| $Na_2O$ % | MgO % | $Al_2O_3$ % |
|---|---|---|
| 9.69 | 23.87 | 0.57 |
| $SiO_2$ % | $P_2O_5$ ppm | $SO_3$ % |
| 11.7 | 249 | 0.04 |
| Cl % | $K_2O$ % | CaO % |
| 6.93 | 0.09 | 0.04 |
| $TiO_2$ % | MnO % | $Fe_2O_3$ % |
| 0 | 0.043 | 3.1900 |
| Zn ppm | As ppm | Br % |
| 18 | | 0.001 |
| Rb ppm | Sr ppm | Y ppm |
| 0 | 2 | 0 |
| Zr ppm | Nb ppm | Ba ppm |
| 0 | 0 | 0 |
| Hg ppm | Pb ppm | <0.6% by weight Alkali Equivalent % |
| | 57 | 9.749 |

| % LOI used | | |
|---|---|---|
| Temp | % LOI | CO3 % diff. |
| 950 | 43.79% | 0.005 |

Example 5

Preparation of Precipitation Material from Olivine

A. Preparation of Precipitation Material

Summary Olivine was digested and in a solution of carbonic acid. Using KOH as a base and $FeCl_3$ as a catalyst, precipitation material comprising digested olivine was precipitated.

Materials 379 L of UCSC seawater at 8° C. and pH=7.87
Bottled gaseous $CO_2$
1 L NaOH 2M-solution
1.5 g $FeCl_3$ (4 ppm)
380.3 g of 280 mesh olivine Protocol Bubbled $CO_2$ into the seawater until a pH of 5.5 was achieved, and for an additional 5 minutes thereafter. Olivine was added to the solution and $CO_2$ bubbling was continued for an additional 30 minutes. The flow of $CO_2$ was stopped, and 2 ppm $FeCl_3$ was added to the solution. Sufficient NaOH was added to achieve a pH of 8.0, and then an additional 2 ppm of $FeCl_3$ was added. Additional NaOH was added until a pH of 9.2 was achieved. The suspension was left to settle overnight. Precipitation material was concentrated by centrifugation and oven-dried at 110° C. Yield: 816.08 g (2.15 gm/L of seawater))

Analysis XRD analysis indicates presence of aragonite, fosterite, and a substantial amorphous phase in the precipitation material.

B. Preparation of a Blended Cement

The BET specific surface area ("SSA") of the Portland cement and the precipitation material used for this experiment are given in Table 2. The particle size distribution was determined after 2 minutes of pre-sonication to dissociate agglomerated particles. The precipitation material had a SSA much higher than the SSA of the Portland cement with which it was mixed.

TABLE 2

BET specific surface area.

| Type II/V Hansen Portland cement | Precipitation material |
|---|---|
| 1.1617 ± 0.0066 $m^2/g$ | 10.4929 ± 0.0230 $m^2/g$ |

The precipitation material (5% and 20%, in two different blends) was blended with the Portland cement by hand for approximately two minutes just before mixing the mortar. The water:cement ratio met the flow criterion of 110%+/−5% for the 5% replacement level (flow=114%). The water:cement ratio was adjusted to 0.58 for the 20% replacement level exceeding the maximum flow value allowed (flow=121%).

Changes to the ASTM C511 storage conditions: The cubes were cured under a wet towel for 24 hours covered with a plastic sheet (estimated relative humidity of 98%).

C. Results

The compressive strength development was determined according to ASTM C109. Mortar cubes of 2" side were used for the compression tests. Replacement levels of 5% and 20% precipitation material were compared to plain Portland type II/V cement mortars and to Portland type II V cement substituted by 20% fly ash F.

TABLE 3

Characterization of cements for Example V.

| Mix Description | Mix Name | BET ($m^2/g$) | W/C | Cement Composition OPC | SEM | FA | Sand Content | Flow | Strength (MPa) 3 days | 7 days | 28 days |
|---|---|---|---|---|---|---|---|---|---|---|---|
| C1157 Strength Range Limit: Min | N/A | | 0.485 | 100% | | | 73% | Not Restricted | 10.0 | 17.0 | 28.0 |
| C1157 | | | | | | | | | | 20.0 | 30.0 |

TABLE 3-continued

Characterization of cements for Example V.

| Mix Description | Mix Name | BET (m²/g) | Cement Composition | | | | Sand Content | Flow | Strength (MPa) | | |
| --- | --- | --- | --- | --- | --- | --- | --- | --- | --- | --- | --- |
| | | | W/C | OPC | SEM | FA | | | 3 days | 7 days | 28 days |
| Strength Range Limit: Max | | | | | | | | | | | |
| 100% OPC | C00092 | 1.16 | 0.51 | 100% | 0% | 0% | 73% | 112% | 22.0 | 32.8 | 43.3 |
| 95% OPC-5% PPT | C00095 | 10.49 | 0.52 | 95% | 5% | 0% | 73% | 114% | 24.5 | 31.5 | 39.3 |
| 80% OPC-20% PPPT | C00097 | 10.49 | 0.58 | 80% | 20% | 0% | 73% | 121% | 15.9 | 22.2 | 27.9 |

Example 6

Measurement of $\delta^{13}C$ Values for Precipitation Material and Starting Materials In this experiment, $\delta^{13}C$ values for precipitation material and starting materials are measured. Carbonate-containing precipitation material was prepared using a mixture of bottled sulfur dioxide (SO2) and bottled carbon dioxide (CO2) gases and fly ash as a surrogate source of divalent cations and silica. The procedure was conducted in a closed container.

The starting materials were a mixture of commercially available bottled SO2 and CO2 gas (SO2/CO2 gas or "simulated flue gas"), de-ionized water, and fly ash.

A container was filled with de-ionized water. Fly ash was added to the de-ionized water after slaking, providing a pH (alkaline) and divalent cation concentration suitable for precipitation of carbonate-containing precipitation material without releasing CO2 into the atmosphere. SO2/CO2 gas was sparged at a rate and time suitable to precipitate precipitation material from the alkaline solution. Sufficient time was allowed for interaction of the components of the reaction, after which the precipitation material was separated from the remaining solution ("precipitation reaction mixture"), resulting in wet precipitation material and supernatant.

$\delta^{13}C$ values for the process starting materials, precipitation material, and supernatant were measured. The analytical system used was manufactured by Los Gatos Research and uses direct absorption spectroscopy to provide $\delta^{13}C$ and concentration data for dry gases ranging from 2% to 20% CO2. The instrument was calibrated using standard 5% CO2 gases with known isotopic composition, and measurements of CO2 evolved from samples of travertine and IAEA marble #20 digested in 2M perchloric acid yielded values that were within acceptable measurement error of the values found in literature. The CO2 source gas was sampled using a syringe. The CO2 gas was passed through a gas dryer (Perma Pure MD Gas Dryer, Model MD-110-48F-4 made of Nafion® polymer), then into the bench-top commercially available carbon isotope analytical system. Solid samples were first digested with heated perchloric acid (2M HClO4). CO2 gas was evolved from the closed digestion system, and then passed into the gas dryer. From there, the gas was collected and injected into the analysis system, resulting in $\delta^{13}C$ data. Similarly, the supernatant was digested to evolve CO2 gas that was then dried and passed to the analysis instrument resulting in $\delta^{13}C$ data.

Measurements from the analysis of the SO2/CO2 gas, metal silicate surrogate (i.e., fly ash), carbonate-containing precipitation material, and supernatant are listed in Table 4. The $\delta^{13}C$ values for the precipitation material and supernatant are −15.88‰ and −11.70‰, respectively. The $\delta^{13}C$ values of both products of the reaction reflect the incorporation of the SO2/CO2 gas ($\delta^{13}C$=−12.45‰) and the fly ash that included some carbon that was not fully combusted to a gas ($\delta^{13}C$=−17.46‰). Because the fly ash, itself a product of fossil fuel combustion, had a more negative $\delta^{13}C$ than the $CO_2$ used, the overall $\delta^{13}C$ value of the precipitation material reflects that by being more negative than that of the CO2 itself. This Example illustrates that $\delta^{13}C$ values may be used to confirm the primary source of carbon in a carbonate-containing composition material.

TABLE 4

Values ($\delta^{13}C$) for starting materials and products of Example 5.

| Atmosphere $\delta^{13}C$ Value (‰) | CO2 Source | CO2 Source $\delta^{13}C$ Value (‰) | Base Source | Base $\delta^{13}C$ Value (‰) | Supernatant Solution $\delta^{13}C$ Value (‰) | Precipitation Material $\delta^{13}C$ Value (‰) |
| --- | --- | --- | --- | --- | --- | --- |
| −8 | SO2/CO2 bottled gas mix | −12.45 | fly ash | −17.46 | −11.70 | −15.88 |

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A method comprising:
   a) digesting a material comprising a metal silicate with an aqueous solution to produce divalent cations and a material comprising $SiO_2$;
   b) reacting the divalent cations with dissolved carbon dioxide to produce a precipitation material in a precipitation reaction mixture; and
   c) separating the precipitation material from the precipitation reaction mixture to produce a separated precipitation material and a supernatant,
   wherein the method is performed in a system comprising:
   a) a processor for processing the material comprising the metal silicate;
   b) a precipitation reactor for precipitating the precipitation material, wherein the precipitation reactor is configured to receive carbon dioxide from an industrial source of carbon dioxide;
   c) an electrochemical system comprising a cathode configured to generate hydrogen gas and an anode configured to generate protons from the hydrogen gas, wherein the electrochemical system is configured to transport hydrogen from the cathode to the anode; and
   d) a liquid-solid separator for separating the precipitation material from the precipitation reaction mixture,
   wherein the precipitation reactor is operably connected to both the processor and the liquid-solid separator, and
   wherein the electrochemical system is operably connected to the processor, the precipitation reactor, or both the processor and the precipitation reactor.

2. The method of claim 1, further comprising comminuting the material comprising the metal silicate prior to digesting the material comprising the metal silicate.

3. The method of claim 2, wherein the material comprising the metal silicate comprises a rock or mineral.

4. The method of claim 3, wherein digesting the material comprising the metal silicate comprises digestion with an acid to produce an acidic solution comprising the divalent cations and the material comprising $SiO_2$.

5. The method of claim 4, wherein the acid is selected from the group consisting of HF, HCl, HBr, HI, $H_2SO_4$, $HNO_3$, $H_3PO_4$, chromic acid, $H_2CO_3$, acetic acid, citric acid, formic acid, gluconic acid, lactic acid, oxalic acid, tartaric acid, ascorbic acid, and meldrums acid.

6. The method of claim 3, wherein digesting the material comprising the metal silicate comprises digestion with a proton-removing agent to produce a basic solution comprising the divalent cations and the material comprising $SiO_2$.

7. The method of claim 1, wherein the divalent cations comprise alkaline earth metal cations.

8. The method of claim 7, wherein alkaline earth metal cations comprise $Ca^{2+}$, $Mg^{2+}$, or a combination thereof.

9. The method of claim 8, further comprising drying the precipitation material in a dryer.

10. The method of claim 9, wherein the method comprises a continuous, semi-batch, or batch process.

11. The method of claim 1, wherein the precipitation reaction mixture is kept between 5° C. to 70° C. when reacting the divalent cations with dissolved carbon dioxide to produce a precipitation material in the precipitation reaction.

12. A system comprising:
   a) a processor for processing a material comprising a metal silicate;
   b) a precipitation reactor for precipitating a precipitation material, wherein the precipitation reactor is configured to receive carbon dioxide from an industrial source of carbon dioxide;
   c) an electrochemical system comprising a cathode configured to generate hydrogen gas and an anode configured to generate protons from the hydrogen gas, wherein the electrochemical system is configured to transport hydrogen from the cathode to the anode; and
   d) a liquid-solid separator for separating the precipitation material from a precipitation reaction mixture,
   wherein the precipitation reactor is operably connected to both the processor and the liquid-solid separator, and
   wherein the electrochemical system is operably connected to the processor, the precipitation reactor, or both the processor and the precipitation reactor.

13. The system of claim 12, wherein the system is further configured with a dryer configured to receive a slurry comprising precipitation material from the liquid-solid separator.

14. The system of claim 13, wherein the dryer is configured to utilize waste heat from the industrial source of carbon dioxide.

15. The system of claim 14, wherein the dryer is configured to provide a heat-depleted industrial source of carbon dioxide to the precipitation reactor.

16. The system of claim 15, wherein the dryer is a spray dryer.

17. The system of claim 12, wherein the electrochemical system is configured to operate at an average voltage of 2.0 volts or less.

18. The system of claim 17, wherein the electrochemical system is configured to not generate chlorine gas.

19. The system of claim 17, wherein the electrochemical system is configured to not generate oxygen gas.

20. The system of claim 17, wherein the electrochemical system is configured to not generate any gaseous byproduct.

* * * * *